United States Patent [19]

Kikuchi

[11] Patent Number: 5,450,335

[45] Date of Patent: Sep. 12, 1995

[54] METHOD OF PROCESSING SPECTACLE FRAME SHAPE DATA

[75] Inventor: Yoshihiro Kikuchi, Akikawa, Japan

[73] Assignee: Hoya Corporation, Tokyo, Japan

[21] Appl. No.: 100,159

[22] Filed: Aug. 2, 1993

[30] Foreign Application Priority Data

Aug. 5, 1992 [JP] Japan .................................. 4-209308
Sep. 24, 1992 [JP] Japan .................................. 4-255018

[51] Int. Cl.⁶ .......................... G02C 3/00; B29D 12/00; G06F 19/00
[52] U.S. Cl. .................................. 364/560; 356/376; 451/256; 364/556
[58] Field of Search .............. 364/560, 413.01, 474.05, 364/474.06, 556; 356/376; 51/101 LE; 382/25; 348/78, 586; 33/507; 451/15, 256, 43

[56] References Cited

U.S. PATENT DOCUMENTS 4,991,305  2/1991  Saigo et al. ............................ 33/507
5,347,762  9/1994  Shibata et al. ........................ 451/15

Primary Examiner—Emanuel T. Voeltz
Assistant Examiner—M. Kemper
Attorney, Agent, or Firm—Armstrong, Westerman, Hattori, McLeland and Naughton

[57] ABSTRACT

A spectacle frame shape data processing method is provided which is applied before lenses are ground or cut according to a frame shape to be fitted in the frame, and by which a three-dimensional frame shape representing the distance between frame rims, inclinations of the frame rims, contours of inner peripheral grooves, etc. can be accurately measured by a frame shape measuring apparatus, and measurement values are corrected such that the frame rim shapes are in bilateral symmetry. Forward directions of the right and left frame rims are calculated, a forward direction of spectacles is calculated based on the calculated forward directions of the right and left frame rims, the direction of a datum line of the spectacles in a plane perpendicular to the calculated forward direction of the spectacles is calculated, and values representing the shape of a predetermined part of the frame rims is calculated based on the calculated forward directions of the right and left frame rims, the calculated forward direction of the spectacles, and the calculated direction of the datum line of the spectacles.

15 Claims, 25 Drawing Sheets

METHOD OF PROCESSING SPECTACLE FRAME SHAPE DATA

BACKGROUND OF THE INVENTION (1) Field of the Invention

The present invention relates to a method of processing spectacle frame shape data in a frame shape measuring apparatus for measuring shapes of spectacle frames, which method is applied before lenses are ground or cut in accordance with a frame shape to be fitted in the frame, and more particularly, to a spectacle frame shape data processing method capable of accurately measuring three-dimensional spectacle frame shapes, such as the distance between frame rims, inclination of the frame rims, and contour of an inner peripheral groove, and correcting the measured values such that the shapes of the frame rims are in bilateral symmetry.

(2) Description of the Related Art

The applicant hereof previously proposed a spectacle lens supply system (Japanese Patent Application No. 4-165912), wherein a desirable lens shape including a bevel figure is calculated at a lens processor side in accordance with information on lens, frame and prescription values transmitted from a lens orderer side, accept/reject information as to whether a lens process including a beveling is possible or not and also an estimated shape of a finished lens including a bevel figure are created based on the received information and supplied to the lens orderer side to be displayed on screen, and the lens orderer side determines whether the lens process including beveling is possible or not, based on the accept/reject information, or confirms the estimated shape of finished lens, to decide and order a lens with an optimum bevel based on the displayed information.

To accomplish such a system, first of all, the frame shape must be determined with accuracy. In particular, measurement values related to the frame shape must be processed with precision to obtain three-dimensional data.

Of the data representing a frame shape, the distance between the right and left frame rims and the inclination thereof are very important data when reproducing a three-dimensional image of spectacles in such a manner that the two frame rims are accurately positioned like real spectacles.

Thus, it is necessary that the distance between the frame rims and the inclination thereof be obtained by processing the measurement values related to the three-dimensional frame shape with precision.

In conventional methods, however, the measurement and the subsequent calculation are performed on condition that the forward direction of spectacles coincides with the Z axis of the frame shape measuring apparatus (vertical axis of a probe shown in FIG. 4). Accordingly, when mounting spectacles to the measuring apparatus, the forward direction of the spectacles must be aligned exactly with the Z axis of the measuring apparatus, thus requiring significant labor for the adjustment.

Furthermore, in practice, there inevitably occurs an error between the forward direction of the spectacles and the Z axis of the frame shape measuring apparatus, making it impossible to accurately calculate the distance between the frame rims and the inclination thereof.

The frame shape measuring apparatus acquires the contour of an inner peripheral groove cut in each frame rim based on the path of travel of a probe which moves along the inner peripheral groove in contact therewith and which has a symmetrical shape with respect to an axis of rotation symmetry. Specifically, the bottom contour of the inner peripheral groove is obtained by projecting the travel path of the center of the probe onto an XY plane and correcting individual points of the projected curve in respective normal directions by an amount equal to the radius of the probe.

However, while the axis of rotation symmetry of the probe is always parallel with the Z axis of the frame shape measuring apparatus, the contour of the inner peripheral groove of the frame rim varies not only in the X- and Y-axis directions but also in the Z-axis direction. Thus, in some cases, the probe may obliquely contact the inner peripheral groove which is V-shaped, possibly causing situations where the edge of the probe is displaced and separated from the bottom of the inner peripheral groove. The conventional correction method mentioned above is unable to cope with such awkward situations; namely, the bottom contour of the inner peripheral groove of the frame rim is erroneously calculated to be smaller than the actual contour by an amount corresponding to the displacement. This problem arises also when the angle of the edge of the probe is large.

As mentioned above, although the shape of a spectacle frame is measured under condition that the forward direction of the spectacles is in alignment with the Z axis of the frame shape measuring apparatus, the axis adjustment consumes much labor, and when the frame is actually mounted to the measuring apparatus, there often arises an error between the forward direction of the spectacles and the Z-axis direction of the measuring apparatus. Thus, even if the same frame is used, the error between the forward direction of the spectacles and the Z axis of the frame shape measuring apparatus, and thus the displacement of the edge of the probe, are subject to variation each time the frame is mounted to the measuring apparatus. As a result, a different contour is derived as the bottom contour of the inner peripheral groove of the frame rim each time the frame is mounted to the frame shape measuring apparatus, though the frame measured is the same. Particularly, the circumference of the inner peripheral groove obtained based on the bottom contour of the groove is greatly affected.

In order to further sophisticate the spectacle lens supply system, the right and left frame rims should be well balanced.

In general, the right and left frame rims should preferably have an identical shape from the viewpoint of outer appearance, but the frame rims sometimes develop a shape difference therebetween due to deformation which may be caused during shipment after manufacture, or by improper handling while being kept, or due to change with time attributable to the frame material. If lenses, for example, bifocal lenses each including a small lens piece, are fitted in a deformed frame, taking no notice of the deformation, the layout position of the small lens piece may differ between the right and left sides. The difference in layout position between the right and left small lens pieces gives rise to poor-balanced spectacles, which may give a strange feeling to a person in front of the spectacles wearer. To make the right and left frame rims well-balanced, a method has been proposed (e.g., in Examined Japanese Patent Publication (KOKOKU) No. 3-25298) in which both lenses are processed based on the shape of one of the right and left frame rims, and the other frame rim is deformed so as to be identical with the counterpart before the lenses are fitted in the frame.

In this conventional method, however, since the shape of one of the frame rims is left unchanged and is used as a reference shape, the other frame rim must be deformed by a large margin if there is a great shape difference between the actual right and left frame rims. Thus, this method is not desirable because application thereof is restricted by the deformation limit.

Further, if the right and left frame rims have different circumferences, a lens which has been processed according to the shape of one of the frame rims cannot be closely fitted in the other frame rim, though the frame rim is deformed by the conventional method.

Furthermore, even though the right and left frame rims have the same shape, they may be inclined differently with respect to the datum line of spectacles, In such cases, the inclination of the frame rim with respect to the datum line changes when the frame rim is deformed by the above method, with the result that the lens axes become misaligned when the lenses are fitted in the frame.

In the conventional method, moreover, since the right and left frame rims are visually checked for shape difference, the results of inspection differ from checker to checker and it is difficult to achieve accurate inspection with stability.

SUMMARY OF THE INVENTION

A first object of the present invention is to provide a frame shape data processing method which is capable of accurately calculating the distance between frame rims and the inclination thereof, irrespective of the mounting position of the frame relative to a frame shape measuring apparatus.

A second object of the present invention is to provide a frame shape data processing method which is capable of accurately calculating the bottom contour of an inner peripheral groove cut in the frame rim, regardless of change of the frame rim shape in a Z-axis direction, or the angle of the edge of a probe, or the mounting position of the frame relative to the frame shape measuring apparatus.

A third object of the present invention is to provide a frame shape data processing method which is capable of making the shapes of right and left frame rims almost symmetrical with each other while requiring only a small amount of deformation of the frame rims, without changing the circumferences of the frame rims or the inclinations thereof with respect to a datum line, thus making the right and left frame rims well-balanced.

A fourth object of the present invention is to provide a frame shape data processing method in which difference of shape between right and left frame rims is quantified to establish a quantitative criterion, thereby permitting accurate and stable shape difference determination.

To achieve the first object, the present invention provides a spectacle frame shape data processing method for calculating values representing shapes of frame rims of spectacles positioned in an arbitrary spatial position with respect to a three-dimensional frame shape measuring apparatus. This method comprises the steps of (1) calculating a forward direction of each of right and left frame rims, (2) calculating a forward direction of the spectacles based on the calculated forward directions of the right and left frame rims, (3) calculating a direction of a datum line of the spectacles in a plane perpendicular to the calculated forward direction of the spectacles, and (4) calculating values representing a shape of a predetermined part of the frame rims of the spectacles based on the calculated forward directions of the right and left frame rims, the calculated forward direction of the spectacles, and the calculated direction of the datum line of the spectacles.

To achieve the second object, the present invention provides a spectacle frame shape data processing method for computing a contour of an inner peripheral groove of a frame rim based on a path of travel of a probe which has a symmetrical shape with respect to an axis of rotation symmetry and which moves along the inner peripheral groove while contacting the same. The method comprises the steps of (1) obtaining an envelope of a travel path of an edge of the probe based on data representing a three-dimensional travel path of the probe, (2) calculating a distance between a bottom of the inner peripheral groove and the edge of the probe, based on data representing the shapes of the inner peripheral groove and the probe, and the data representing the three-dimensional travel path of the probe, and (3) obtaining a contour of the bottom of the inner peripheral groove by shifting the envelope in a normal direction by the calculated distance.

To achieve the third object, the present invention provides a spectacle frame shape data processing method for almost symmetrically matching shapes of right and left frame rims with each other. The method comprises the steps of (1) calculating a centroid of each of shapes of the right and left frame rims, (2) rotating one of the right and left frame rim shapes about an axis of rotation symmetry such that the right and left frame rim shapes are substantially superposed one upon the other with the calculated centroids coinciding with each other, (3) creating a merged shape based on the substantially superposed right and left frame rim shapes, and (4) calculating new right and left frame rim shapes based on the created merged shape.

To achieve the fourth object, the present invention provides a spectacle frame shape data processing method for almost symmetrically matching shapes of right and left frame rims with each other. This method comprises the steps of (1) calculating a centroid of each of shapes of the right and left frame rims, (2) rotating one of the right and left frame rim shapes about an axis of rotation symmetry such that the calculated centroids coincide with each other, (3) rotating one of the right and left frame rim shapes whose centroids have been made coincident with each other, about an axis passing through the coincident centroids such that a summation of distances between corresponding points of the right and left frame rim shapes is a minimum, (4) acquiring a minimum summation of distances between the corresponding points of the right and left frame rim shapes and a rotation angle by which the one of the right and left frame rim shapes is rotated, and (5) comparing the minimum summation of the distances and the rotation angle with respective preset allowable values, to determine a difference between the right and left frame rim shapes.

In this specification, matching shapes of right and left frame rims with each other is defined as almost symmetrically matching both of the shapes or deforming both of the shapes into respective symmetrically similar figures.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described with reference to the drawings.

Figure 1:
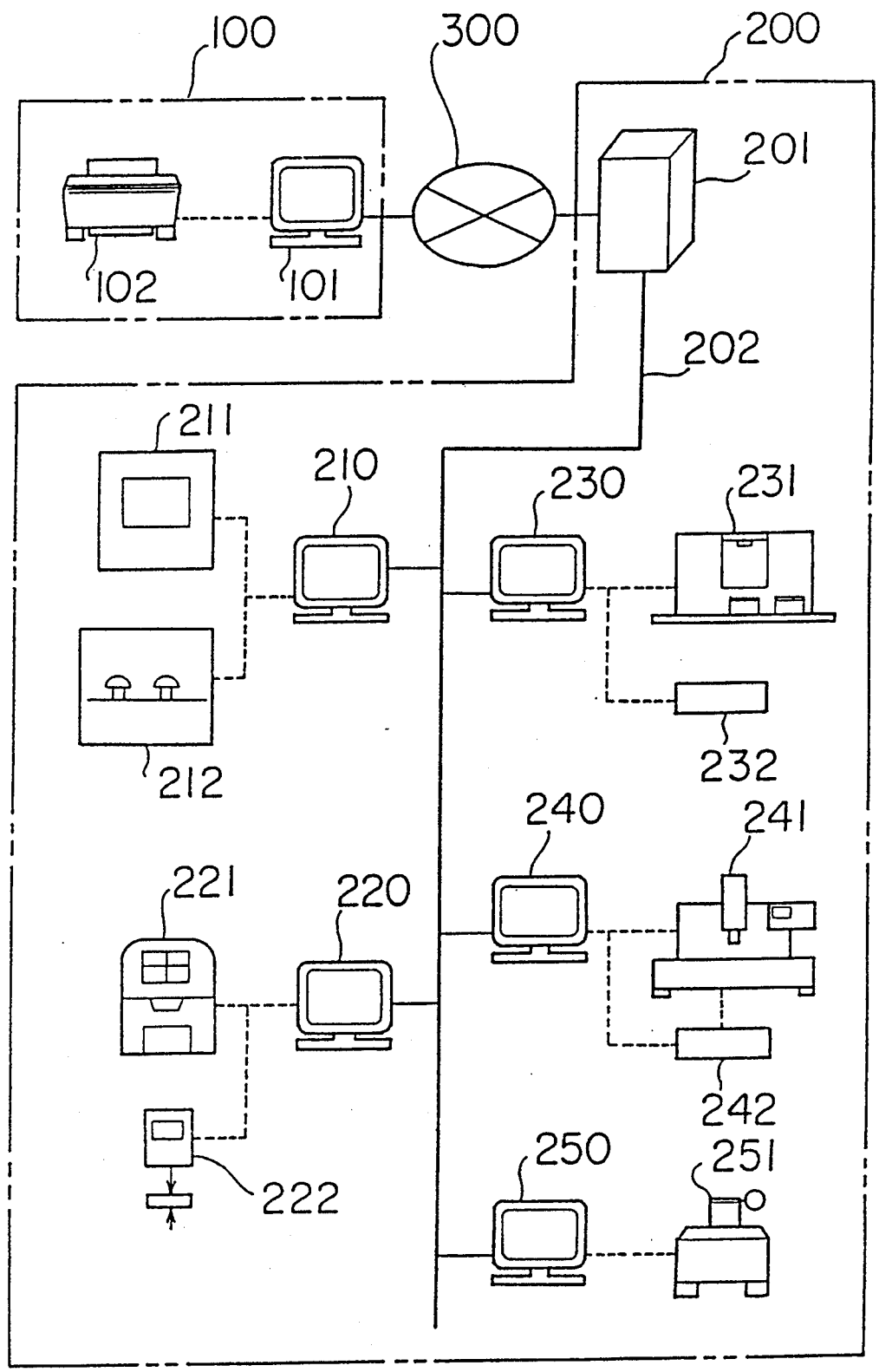
FIG. 1 is a diagram illustrating the entire configuration of a spectacle lens supply system.

FIG. 1 illustrates the entire configuration of a spectacle lens supply system to which a frame shape data processing method according to the present invention is applied. A spectacle store 100, which is an orderer side, is connected to a lens maker's factory 200, which is a lens processor side, via a public communication line 300. Although the figure illustrates only one spectacle store, in practice a plurality of spectacle stores are connected to the factory 200.

In the spectacle store 100 are installed an on-line terminal computer 101 and a frame shape measuring apparatus 102. The terminal computer 101 comprises a keyboard as an input device and a CRT display device, and is connected to the public communication line 300. Actual measured values of a spectacle frame are supplied from the frame shape measuring apparatus 102 to the terminal computer 101 to be processed thereby, and also spectacle lens information, prescription values, etc. are input to the computer 101 through the keyboard. Output data from the terminal computer 101 is transferred on-line to a mainframe 201 in the factory 200 through the public communication line 300. A relay station may be provided between the terminal computer 101 and the mainframe 201. Further, the location where the terminal computer 101 is installed is not limited to the spectacle store 100.

The mainframe 201 stores a lens process/design program, a bevel process/design program, etc., computes a lens shape including a bevel figure in accordance with the input data, and transfers the results of computations to the terminal computer 101 through the public communication line 300 to be displayed at the display device, as well as to terminal computers 210, 220, 230, 240 and 250 in the factory 200 via a LAN 202.

The terminal computer 210 is connected to a rough edger (curve generator) 211 and a sand polisher 212. In accordance with the results of computations supplied from the mainframe 201, the computer 210 controls the rough edger 211 and the sand polisher 212 to finish the curved rear surface of a lens whose front surface is already finished.

The terminal computer 220 is connected to a lens meter 221 and a thickness gauge 222. The computer 220 compares measurement values obtained by the lens meter 221 and the thickness gauge 222 with the results of computations supplied from the mainframe 201, to perform an acceptance/rejection inspection on each lens whose curved rear surface has been finished, and puts a mark (three-point mark) indicating the optical center on each of accepted lenses.

The terminal computer 230 is connected to a marker 231 and an image processor 232. In accordance with the results of computations supplied from the mainframe 201, the computer 230 determines a blocking position at which a lens is to be blocked (held) when edging and beveling are carried out, and puts a mark indicating the blocking position on the lens. A blocking jig is fixed on the lens at the blocking position.

The terminal computer 240 is connected to a numerically controlled (NC) lens grinding machine 241 composed of a machining center, and a chuck interlock 242. In accordance with the results of computations supplied from the mainframe 201, the computer 240 carries out edging and beveling of lenses.

The terminal computer 250 is connected to a measuring apparatus 251 for measuring the bevel vertex figure. The computer 250 compares the circumference and shape of a beveled lens, measured by the apparatus 251, with the results of computations supplied from the mainframe 210, to determine whether the process is acceptable or not.

Figure 2:
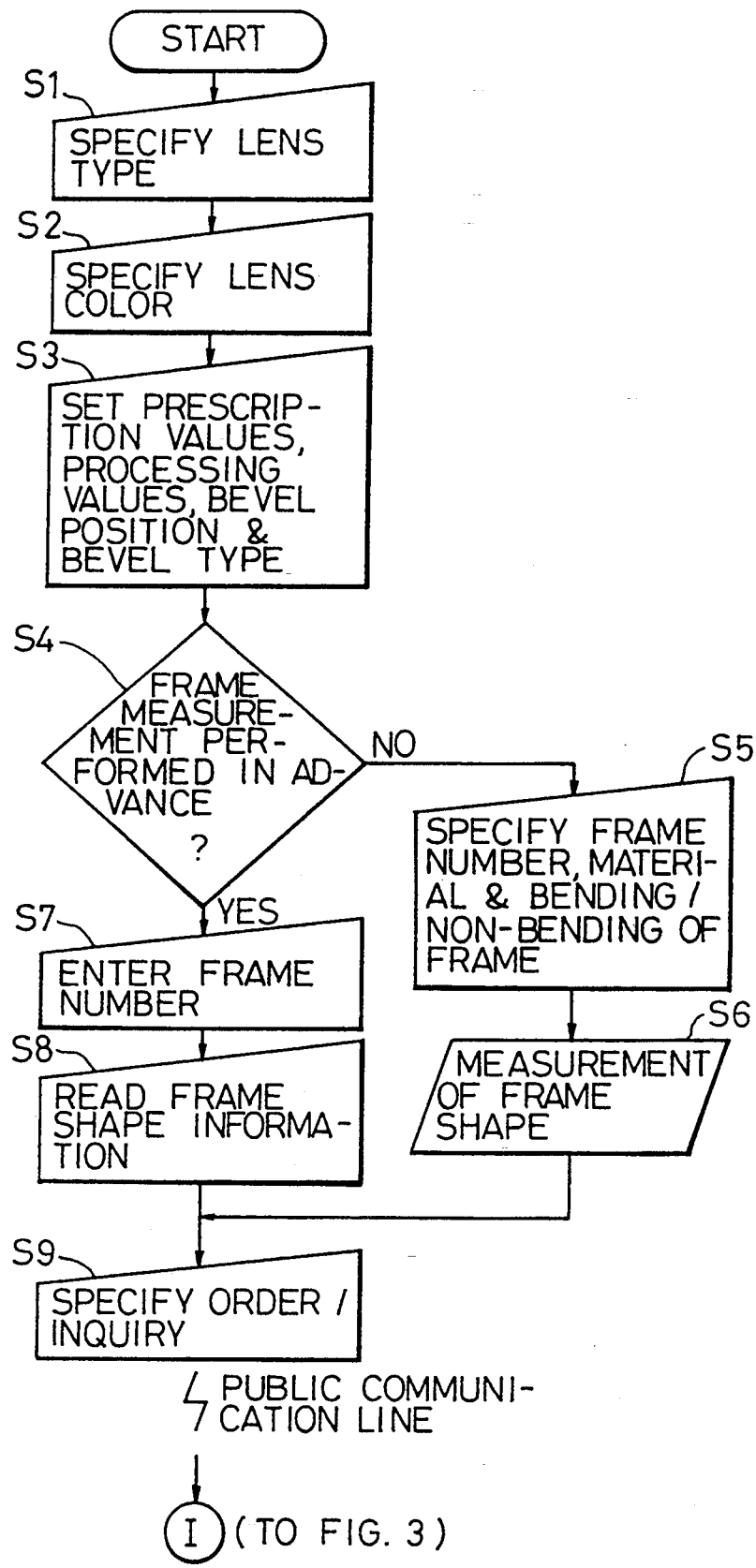
FIG. 2 is a flow chart showing an initial input process carried out on the part of a spectacle store.
Figure 3:
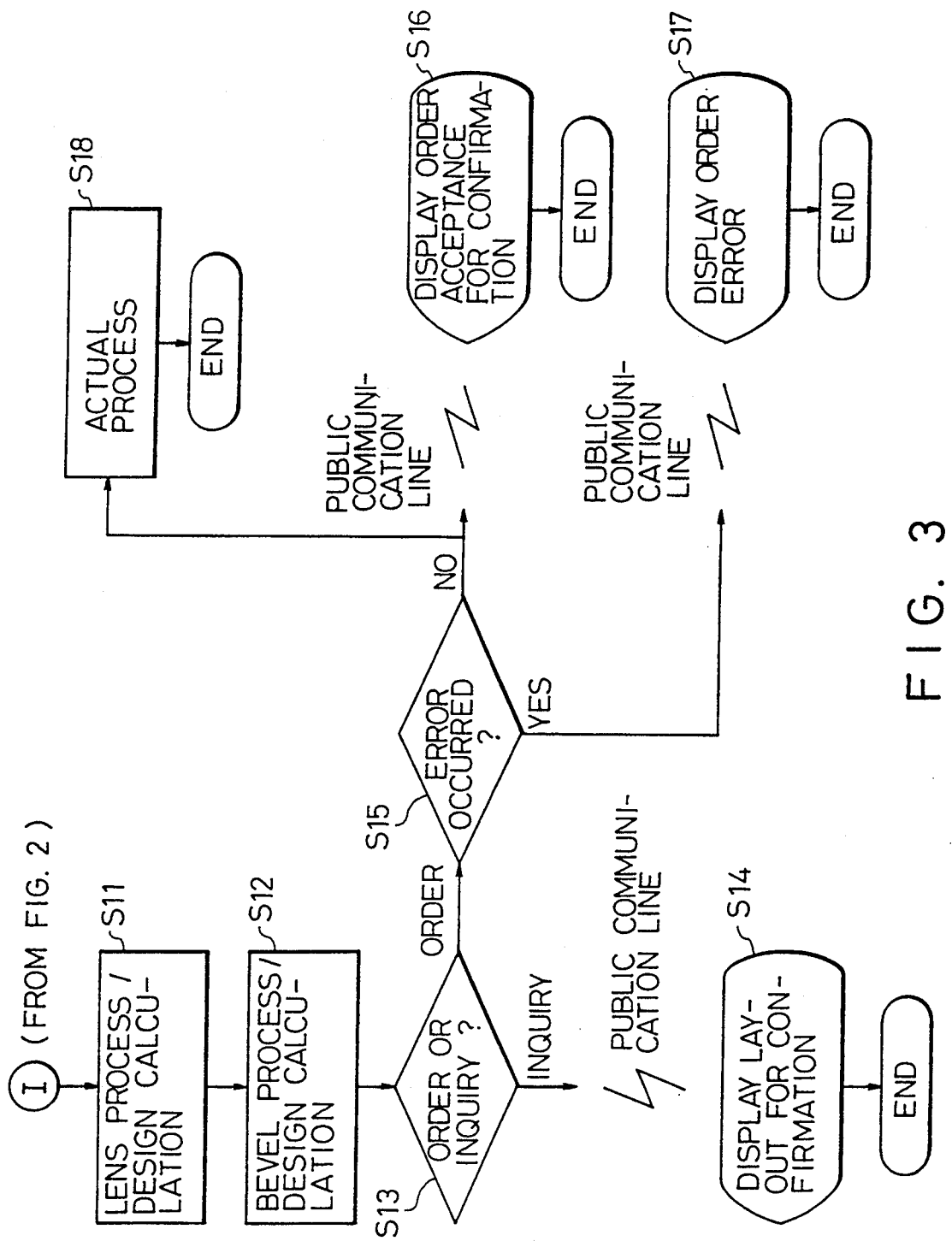
FIG. 3 is a flow chart showing a process executed on the side of a factory, a step of confirmation by a spectacle store in response to data transferred from the factory, and a step of error indication.

Referring now to FIGS. 2 and 3, the process flow for supplying spectacle lenses in the system configured as above will be described. The process flow is classified into an "inquiry" process and an "order" process. The "inquiry" process is a process wherein the spectacle store 100 requests the factory 200 to provide information as to predicted shape of finished lenses after a lens processing including beveling, and the "order" process is a process wherein the spectacle store 100 requests the factory 200 to deliver unedged lenses or beveled lenses.

FIG. 2 is a flow chart showing an initial input process carried out on the part of the spectacle store 100. In the chart, numbers following "S" denote step numbers.

[S1] A lens order/inquiry program is started in the terminal computer 101 of the spectacle store 100, and an order entry screen is displayed at the display device. Viewing the order entry screen, the operator at the spectacle store 100 specifies a lens type to be ordered or inquired through the keyboard.

Specifically, the operator enters various items of information, such as lens type, data as to whether the lens to be ordered or inquired is a beveled lens or an unedged and unbeveled lens, a process for reducing the lens thickness to the smallest possible value, and a process for chamfering the edge of a minus lens to make it inconspicuous and polishing the chamfered surface.

[S2] A lens color is specified.

[S3] In this step, prescription values and processing values for the lens, spectacle frame information, layout information specifying eyepoints, beveling mode, bevel position and bevel figure are entered.

The beveling mode includes "1:1", "1:2", "Front Curve Tracing", "Frame Tracing" and "Auto-beveling" modes, one of which is selected according to where in the lens edge a bevel is to be formed. The "Front Curve Tracing", for example, is a mode in which a bevel is formed so as to adjoin the front (obverse) surface of a lens.

Entry of bevel position is permitted when the selected beveling mode is "Front Curve Tracing", "Frame Tracing" or "Auto-beveling". The bevel position indicates how far the front bottom of the bevel should be shifted from the front edge of the lens toward the rear thereof, and can be set in units of 0.5 mm.

[S4] It is determined whether the shape of the frame concerned is already measured by the frame shape measuring apparatus 102 shown in FIG. 1. If the measurement is completed, the program proceeds to Step S7, and if not, the program proceeds to Step S5.

[S5] First, the program executed by the terminal computer 101 at the spectacle store 100 switches from the lens order/inquiry program to a frame shape measurement program. Then, a measurement number attached to the frame whose shape is to be measured is entered. Also, the material (metal, plastic material or the like) of the frame is specified, and further, whether the frame may be bent or not is specified.

[S6] The frame to be measured is fixed in the frame shape measuring apparatus 102 and the measurement is started. The arrangement of the frame shape measuring apparatus 102 and details of Step S6 will be described in detail later with reference to FIGS. 4 and 5, respectively.

The values measured by the frame shape measuring apparatus 102 are processed by the terminal computer 101, and the results of computations are displayed at the display device of the computer 101, In the event the measured values involve significant discrepancy or there is a large difference of shape between the right and left frame rims, such an erroneous state is shown at the display device as an error message.

When an error message is displayed on the display device at the spectacle store 100, the frame is checked according to the contents of the error message, and the measurement is carried out again.

[S7] If the frame shape is already measured and the results of the measurement are stored, the measurement number affixed to the frame is entered to retrieve the stored measurement values.

[S8] In accordance with the entered measurement number, stored information representing the shape of the corresponding frame is read from an internal storage medium.

[S9] "Inquiry" or "Order" is specified.

The data obtained in the aforementioned steps, such as the lens information, prescription values, and frame information, is transmitted to the mainframe 201 at the factory 200 through the public communication line 300.

FIG. 3 is a flow chart showing a flow of process executed on the side of the factory 200, confirmation steps for the data transferred from the factory 200 to the spectacle store 100, and an error display step. In the chart, numbers following "S" represent step numbers.

[S11] The mainframe 201 at the factory 200 stores a lens order receipt system program, a lens process/design program, and bevel process/design program. When data such as the lens information, prescription values, frame information, layout information, and bevel information is received via the public communication line 300, the lens process/design program is started following the lens order receipt system program, to carry out lens process/design calculation.

Specifically, it is determined whether the outer diameter of the specified lens is large enough. If the outer diameter of the lens is deficient, the lens order receipt system program is restarted to calculate the direction and amount of the deficiency in a boxing system and to display the obtained data at the terminal computer 101 in the spectacle store 100.

If the outer diameter of the lens is large enough, the front curve of the lens is determined.

Subsequently, lens thickness is determined. After determining the lens thickness, rear curve of the lens, prism values, and a base direction of the prism are computed, thus determining the whole shape of unedged lens.

Then, the edge thickness is checked along the entire circumference with respect to each of radius vectors in the individual directions of the frame rim, to determine whether any edge portion fails to satisfy the required edge thickness. If an edge portion has a deficient thickness, the lens order receipt system program is restarted to calculate the direction and amount of the deficiency in the boxing system and to display the obtained data at the terminal computer 101 in the spectacle store 100.

If the edge thickness is large enough along the entire circumference, the weight of the lens, maximum and minimum edge thicknesses, directions of the maximum and minimum edge thicknesses, etc. are calculated.

Then, processing values necessary for the terminal computer 210 at the factory 200 to process the rear surface of the lens are computed.

These computations are necessary for a lens polishing step carried out by the terminal computer 210, rough edger 211, and sand polisher 212 prior to the edging, and the computed various values are transferred to the subsequent step.

A lens in stock may be specified and no lens polishing step may be needed prior to the edging. In such a case, since the outer diameter, thickness, front curve and rear curve of the lens are already determined by the lens type and the prescription values and are stored, the stored values are read, the outer diameter and edge thickness of the lens are checked for deficiency, as in the case of a lens whose rear surface has been processed, and the data is transferred to the subsequent step.

[S12] In the mainframe 201, the bevel process/design program is started following the lens order receipt system program, to carry out bevel process/design calculation.

First, data representing a three-dimensional shape of the frame is corrected according to the frame material, to correct error in the frame shape data attributable to the frame material.

Then, the three-dimensional relationship between the frame position and the lens position is determined based on the eyepoint.

An origin for lens processing, which is used as a reference point when holding the lens for beveling, and an axis for lens processing, which is an axis of rotation, are determined, and the data obtained till this stage is transformed into corresponding data with reference to the thus-set processing coordinate system.

Subsequently, a three-dimensional figure of the bevel edge (including a beveling path) is determined according to the specified beveling mode. In this case, the three-dimensional figure of the bevel edge is deformed on condition that the circumference of the bevel remains the same, and an estimated amount of such deformation is computed, When the selected beveling mode is the frame tracing mode, or when the frame should not be bent, the figure of the bevel must be left unchanged, If the beveling cannot be implemented without deforming the bevel figure, an error code is output.

The calculated amount of deformation is compared with a deformation limit set for each of frame materials, and if the deformation limit is exceeded, an error code is output.

The eyepoint shifts if the three-dimensional figure of the bevel edge is deformed or altered, and therefore, the resulting error is corrected. Also, an error associated with reproduction is corrected.

The processes mentioned above can be selectively executed.

In this manner, calculation for the three-dimensional beveling is performed.

[S13] If "Order" was specified in Step S9 of FIG. 2, the program proceeds to Step S15; if "Inquiry" was specified, data responsive to the inquiry is transmitted to the terminal computer 101 at the spectacle store 100 via the public communication line 300, and the program proceeds to Step S14.

[S14] In this step, the terminal computer 101 displays the predicted shape of beveled lens or an error status on the display device, based on the data transmitted from the mainframe 201 at the factory 200 in answer to the inquiry. The operator at the spectacle store 100 is allowed to modify or confirm the specified data, based on the contents of the displayed information.

If no error has occurred in the process/design calculations in Steps S11 and S12 of FIG. 3, various screens are successively displayed at the display device of the terminal computer 101 shown in FIG. 1. The various screens include an order entry reception screen for displaying the thicknesses and weights of lenses, a layout confirmation screen for graphically displaying the lenses positioned according to the layout information specified with respect to the frame, a solid figure screen for displaying, in any desired direction, the right and left lenses spatially positioned as if they were set in the frame, a bevel confirmation screen for displaying in detail the lens shape and the relationship between the edge and bevel positions, and a bevel balance screen in which the edge thicknesses and bevel positions of the right and left lenses are shown in development along the bevels.

If an error has occurred during the process/design calculation in Step S11 or S12 of FIG. 3, an error message indicating the erroneous state is displayed at the display device of the terminal computer 101 in FIG. 1.

[S15] If "Order" was specified in Step S9 of FIG. 2, this step is executed, wherein it is determined whether an error has occurred in the process/design calculations carried out in Steps S11 and S12 of FIG. 3, If an error has occurred, information indicating the occurrence of the error is transmitted to the terminal computer 101 at the spectacle store 100 through the public communication line 300, and the program proceeds to Step S17. In the case of no error occurring, information indicating non-occurrence of error is transmitted to the terminal computer 101 at the spectacle store 100 via the public communication line 300, and the program proceeds to Step S16, as well as to Step S18.

[S16] The message "Order Accepted" is displayed at the display device of the terminal computer 101 in the spectacle store 100, whereby the operator can ascertain that an order has been placed for unedged or beveled lenses that can be fitted in the frame without fail.

[S17] The message "Order Rejected" is displayed, since an error has occurred during the lens or bevel process/design calculation and the lens ordered cannot be processed.

[S18] If "Order" was specified in Step S9 and at the same time no error has occurred during the lens or bevel process/design calculation, an actual lens process, such as rear-surface polishing, edging, and beveling, is carried out at the factory 200.

Specifically, the results of the lens process/design calculation in Step S11 are previously supplied to the terminal computer 210 shown in FIG. 1, and the rear curve of the lens is finished by the rough edger 211 and the sand polisher 212 in accordance with the results of the calculation supplied thereto. Further, coloring, surface treatment, and other steps preceding the edging are carried out by various machines, not shown. These steps are skipped in the case where a lens in stock for which these steps have been carried out was specified. Then, the spectacle lens which has been subjected to the steps preceding the edging is inspected for optical properties and appearance quality. To carry out this inspection, the terminal computer 220, lens meter 221, and thickness gauge 222 shown in FIG. 1 are used, and a three-point mark indicating the lens axis is put on the lens. In the case where the order from the spectacle store 100 is for unedged lenses, the lenses are shipped to the spectacle store 100 after the quality inspection.

Subsequently, based on the results of the calculation in Step S12, the blocking jig for holding the lens is fixed at a predetermined position relative to the lens, by means of the terminal computer 230, marker 231, image processor 232, etc. shown in FIG. 1. The lens fixed to the blocking jig is mounted to the lens grinding machine 241 shown in FIG. 1.

The mainframe 201 in FIG. 1 then performs calculation similar to the bevel process/design calculation in Step S12, to calculate a three-dimensional bevel edge figure. In practice, however, there may arise an error between the calculated lens position and an actual lens position; such an error is corrected after completion of the coordinate transformation into the processing coordinate system.

Then, based on the calculated three-dimensional figure of the bevel edge, data representing a three-dimensional processing path with reference to the processing coordinate system, which is used when grinding the lens with a grindstone having a predetermined radius, is calculated.

The processing path data thus calculated is supplied to the NC (numerically controlled) lens grinding machine 241 through the terminal computer 240. The lens grinding machine 241 edges and bevels the lens in accordance with the data supplied thereto.

Finally, the circumference and figure of the bevel vertex of the beveled lens are measured by the terminal computer 250 and the measuring apparatus 251. The terminal computer 250 compares the design circumference of the bevel vertex, calculated in Step S12, with the measured value obtained by the measuring apparatus 251, and if the difference between the design circumference and the measured circumference is not greater than, e.g., 0.1 mm, the lens is regarded as an acceptable lens. Further, design dimensions A and B of the frame rim, calculated in Step S12, are compared with the measured dimensions A and B obtained by the measuring apparatus 251. If the difference between the design size and the measured size is not greater than, e.g., 0.1 mm, the lens is regarded as an acceptable lens.

The beveled lens thus finished is shipped to the spectacle store 100.

Figure 4:
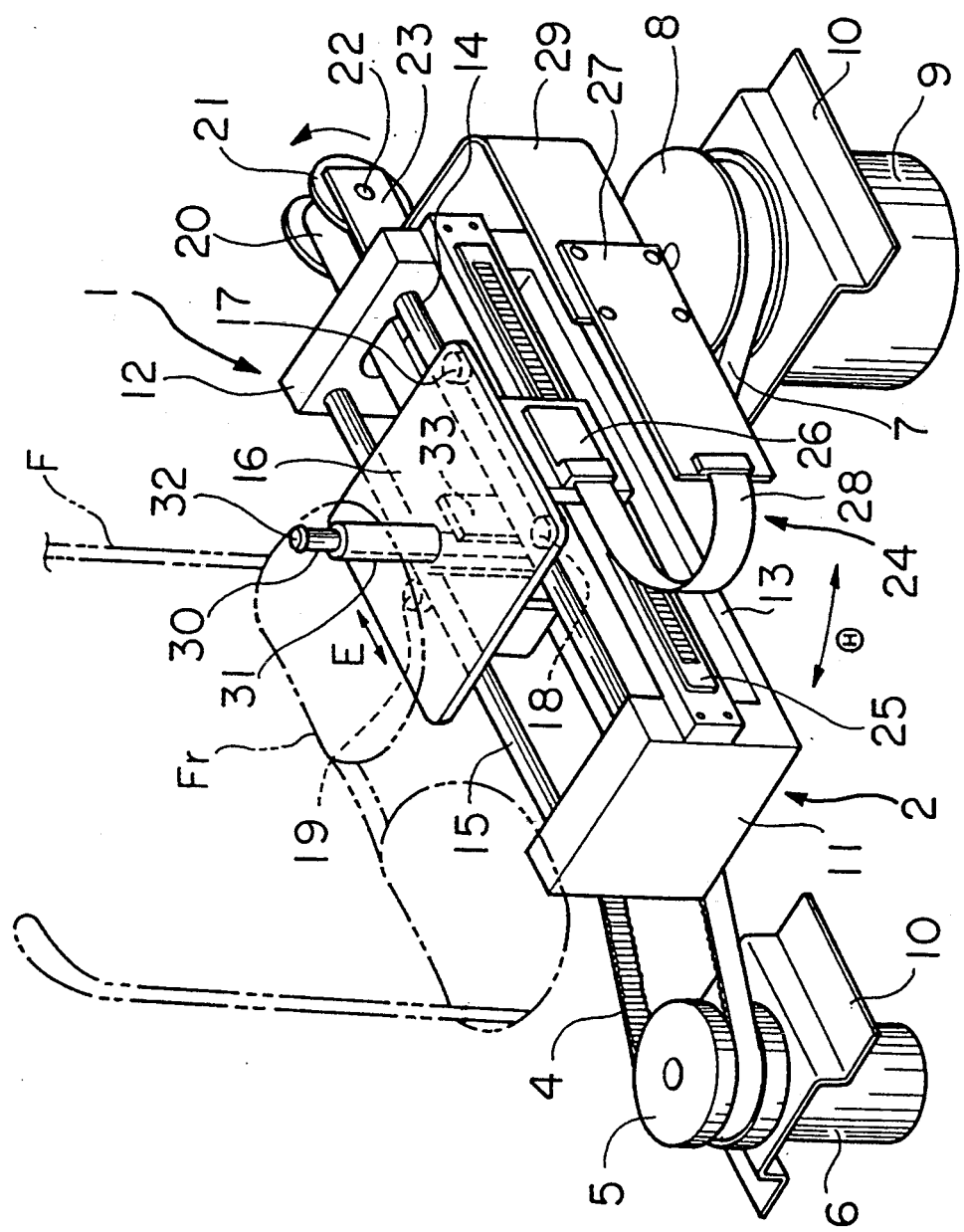
FIG. 4 is a perspective view schematically showing the arrangement of a frame shape measuring apparatus.

FIG. 4 is a perspective view schematically showing the arrangement of the frame shape measuring apparatus 102 which is used for the measurement of spectacle frames carried out in Step S6 of FIG. 2. Unexamined Japanese Patent Publication (KOKAI) No. 1-305308, filed by the applicant hereof, discloses a frame shape measuring apparatus in detail, and the measuring apparatus disclosed therein is used in this embodiment.

The frame shape measuring apparatus comprises a measurement section I for measuring the shape of each rim Fr of a frame F which is immovably fixed at a predetermined position by frame holding means, not shown. The measurement section 1 includes a U-shaped rotatable base 2, which is rotated in direction Θ by a motor 6 through the medium of a timing pulley (not shown) attached to the lower surface of the base 2, a timing belt 4, and a timing pulley 5. The angle of rotation of the base 2 is detected by a rotary encoder 9, which is connected to the not shown timing pulley attached to the base 2 by means of a timing belt 7 and a timing pulley 8. The motor 6 and the rotary encoder 9 are fixed to a base plate 10 of the frame shape measuring apparatus (FIG. 4 illustrates only part of the base plate 10 for ease of understanding of the other parts of the measuring apparatus, and the base plate 10 actually extends over a region corresponding to the entire underside of the rotatable base 2), and the aforementioned not shown timing pulley and the rotatable base 2 are rotatably journaled on the base plate 10 by bearings, not shown.

The rotatable base 2 of the measurement section 1 has two side plates 11 and 12 and a rectangular center plate 13 connecting the side plates together. Two slide guide shafts 14 and 15 extend in parallel between the side plates 11 and 12 and are fixed thereto. A horizontal slide plate 16 is slidably guided in direction E by the slide guide shafts 14 and 15. To this end, the slide plate 16 has three rotatable slide guide rollers 17, 18 and 19 at the lower surface thereof. Two slide guide rollers 17 and 18 contact the slide guide shaft 14 while the remaining slide guide roller 19 contacts the slide guide shaft 15, thus retaining the slide guide shafts 14 and 15 from outside, and the slide guide rollers 17, 18 and 19 roll along the corresponding slide guide shafts 14 and 15.

The slide plate 16 is applied with the force of a constant force spring 20 in the slide direction E, and thus is pulled toward the side plate 12. The constant force spring 20 has one end rolled round a bushing 21 and fixed to the side plate 12 by means of a shaft 22 and a bracket 23. The other end of the constant force spring 20 is attached to the slide plate 16. The constant force spring 20 serves to push a stylus 30, described later, against the inner peripheral groove of the frame rim Fr.

A distance R by which the slide plate 16 is moved in the direction E is measured by a reflection type linear encoder 24 serving as a displacement measuring scale. The linear encoder 24 is composed of a scale 25 extending between the side plates 11 and 12 of the rotatable base 2, a detector 26 fixed to the slide plate 16 and movable along the scale 25, an amplifier 27, and a flexible cable 28 connecting the amplifier 27 and the detector 26. The amplifier 27 is mounted to a bracket 29 which in turn is fixed to the side plate 12.

As the slide plate 16 moves, the detector 26 also moves while keeping a constant distance from the surface of the scale 25, and supplies a pulse signal corresponding to the movement to the amplifier 27 through the flexible cable 28. The amplifier 27 amplifies the received signal and outputs the amplified signal via a counter (not shown) as data representing the distance R moved.

The stylus 30 serving as a probe is supported on the slide plate 16. Specifically, the stylus 30 is supported by a sleeve 31, which is fixed to the slide plate 16, via a slide bearing such that it is rotatable and also movable in the vertical direction (Z-axis direction). The stylus 30 has a head 32 having a shape resembling an abacus bead. The head 32 is disposed in contact with the inner peripheral groove of the frame rim Fr due to the effect of the constant force spring 20, and rolls along the inner peripheral groove of the frame rim Fr as the rotatable base 2 rotates.

At this time, the stylus 30 moves in the radius direction in accordance with the shape of the frame rim Fr. The distance R moved in the radius direction is measured by the linear encoder 24 through the medium of the sleeve 31 and the slide plate 16, as mentioned above.

The stylus 30 also moves in the Z-axis direction in accordance with the curve of the frame rim Fr. The distance moved in the Z-axis direction is measured by a Z-axis measuring device 33 formed as a displacement measuring scale. The Z-axis measuring device 33 is fixed to the slide plate 16 and detects the movement of the stylus 30 in the Z-axis direction as a displacement Z, by means of a built-in charge-coupled device (CCD) line image sensor and a light-emitting diode (LED) serving as a light source. The line image sensor and the light-emitting diode are arranged on opposite sides of the stylus 30.

The operation of the frame measuring apparatus constructed as above will be now described.

The frame F is firmly held by the frame holding means (not shown), then the head 32 of the stylus 30 is disposed in contact with the V-shaped inner peripheral groove of the frame rim Fr, and the motor 6 is rotated by a control device, not shown. Consequently, the rotatable base 2 connected to the motor 6 by the timing belt 4 rotates, and the stylus 30 rolls along the inner peripheral groove of the frame rim Fr in contact therewith. Rotation of the measurement section 1 causes rotation of the rotary encoder 9 which is connected to the section by the timing belt 7, and is detected as an angle of rotation ($\theta$). Movement of the stylus 30 in the radius direction is detected by the linear encoder 24 in terms of distance R by which the slide plate 16 is moved in the direction E, while vertical movement of the stylus 30 is detected by the Z-axis measuring device 33 as displacement Z in the Z-axis direction. The values $\theta$, R and Z, which are cylindrical coordinates, are not measured continuously, but are measured intermittently each time the rotation angle ($\theta$) increases by a predetermined amount, and supplied to the terminal computer 101 in FIG. 1. The coordinates input to the computer are, therefore, hereinafter referred to as measured three-dimensional shape data (Rn, $\theta$n, Zn) (n=1, 2, 3, ..., N), where N denotes the number of measurements effected per revolution.

In this embodiment, points in sequence or vectors followed by the symbol "n" (like n=1, 2, 3, ..., N) represent points or vectors that are spatially arranged in ascending order of the number "n" and indicate periodic data having the frequency N with respect to "n".

As the rotatable base 2 makes one revolution, the frame holding means slides over a predetermined distance while holding the frame F, whereby the stylus 30 is set with respect to the other frame rim for measurement of the shape thereof. The predetermined distance by which the frame holding means slides is preset to a fixed value, and thus it is possible to learn the relationship of relative position between the right and left frame rims Fr, based on the preset value and the measurement data on the right and left frame rims Fr. In the following, the preset value is expressed in three dimensions and referred to as relative position data ($\delta$X, $\delta$Y, $\delta$Z). This data is input to the terminal computer 101 shown in FIG. 1. Also, various constants, such as the radius SR of the stylus 30, and the angle BA and width BW of the inner peripheral groove, are previously input to the terminal computer 101.

Figure 5:
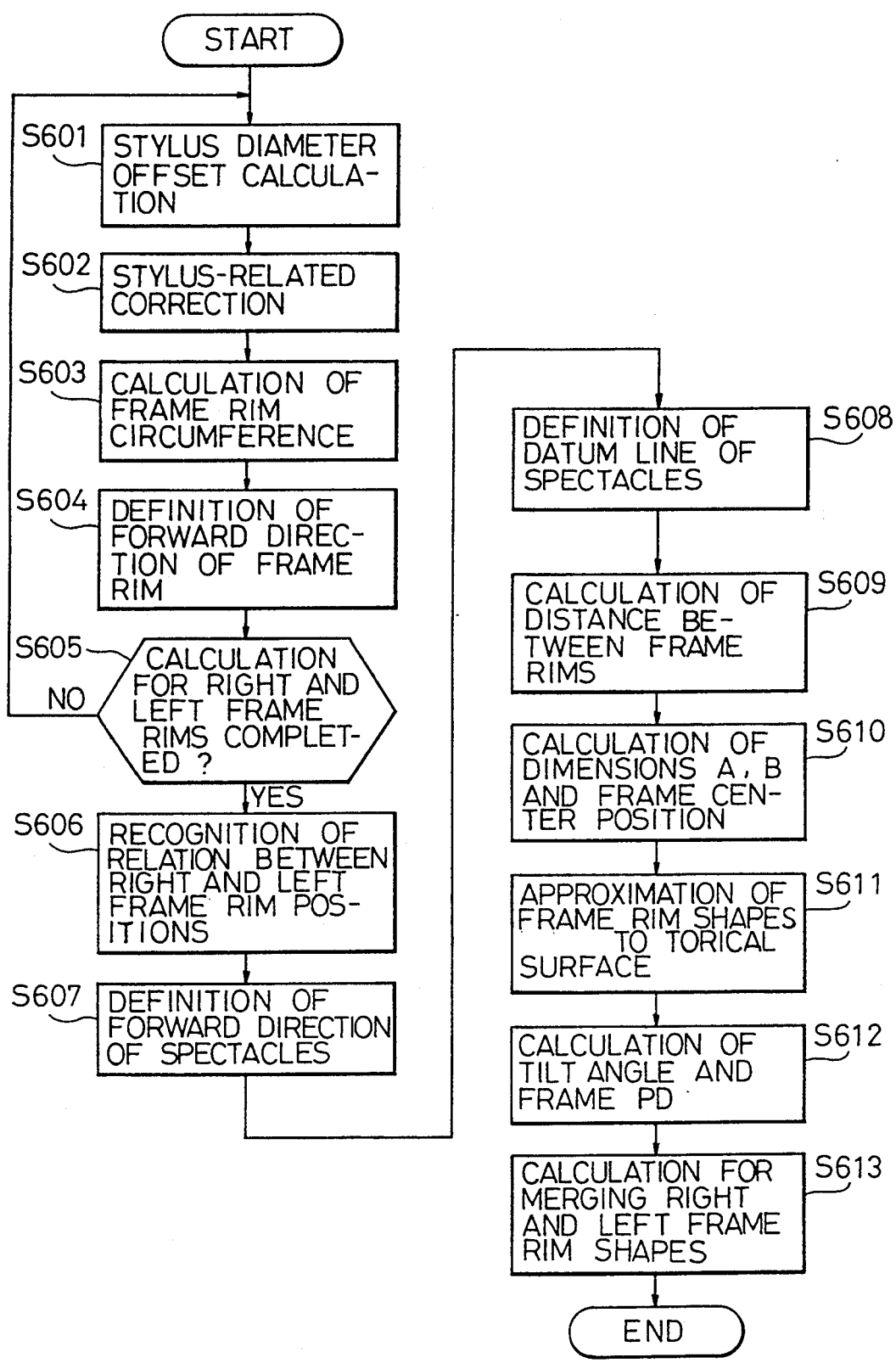
FIG. 5 is a flow chart of a calculation process executed by a terminal computer at a spectacle store and corresponding to the process of Step S6 in FIG. 2.

FIG. 5 is a flow chart showing the procedure of a calculation process executed by the terminal computer 101 based on the data supplied thereto. This calculation process corresponds to the process of Step S6 in FIG. 2. In the chart, numbers following "S" represent step numbers.

[S601] Strictly, the measured three-dimensional shape data (Rn, $\theta$n, Zn) is data representing the path along which the axis of the head 32 of the stylus 30 moved, and does not express the contour of the inner peripheral groove of the frame rim. To obtain an accurate shape of the frame rim (the contour of the inner peripheral groove), an envelope generated by the edge of the stylus 30 (part contacting the bottom of the inner peripheral groove) must be calculated (in this embodiment, the calculation for deriving the envelope is called offset calculation). The offset calculation will be explained with reference to FIGS. 6 and 7.

Figure 6:
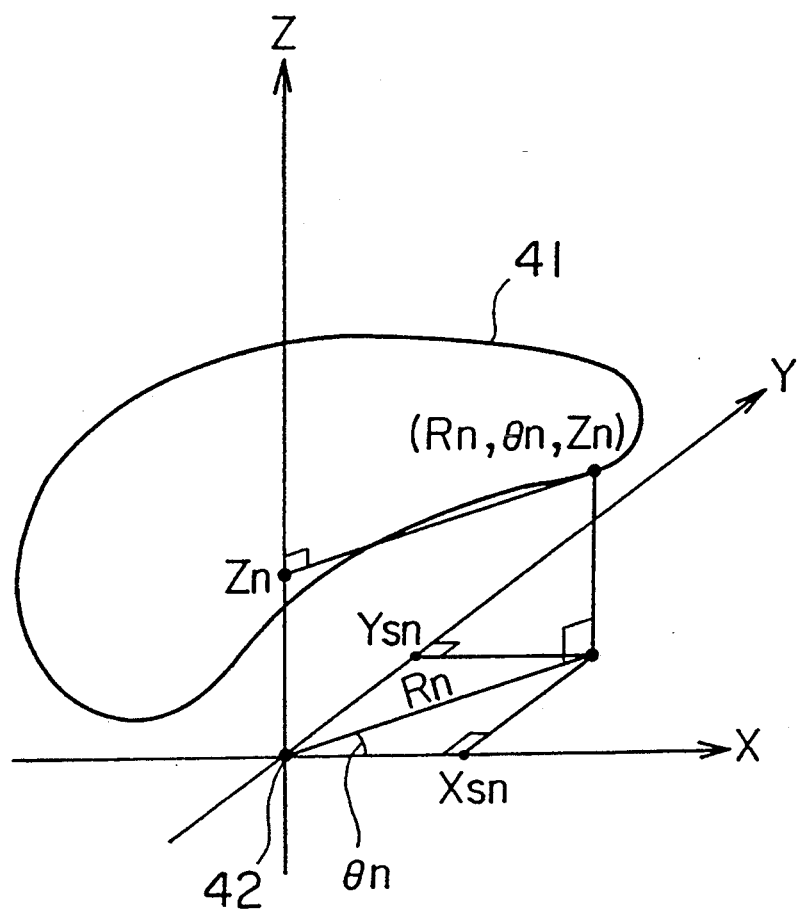
FIG. 6 is a diagram showing a travel path of the axis of a stylus head along an inner peripheral groove of a frame rim.
Figure 7:
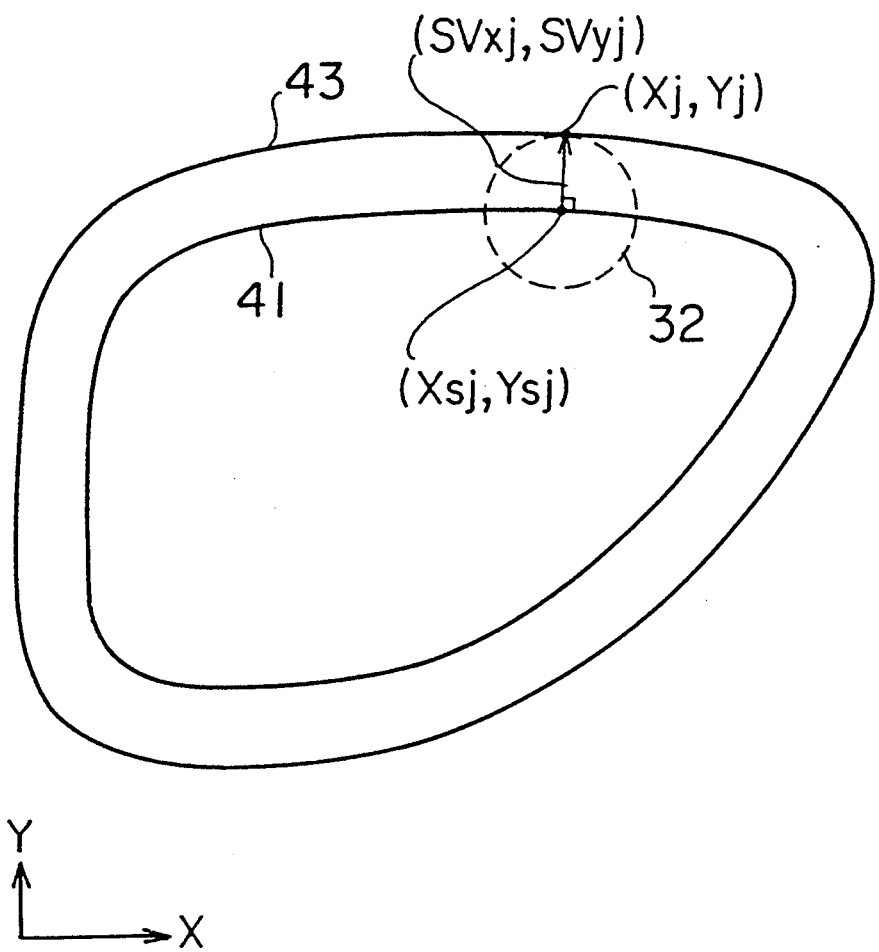
FIG. 7 is a plan view showing the travel path of the axis of the stylus head and the contour of the inner peripheral groove of a frame rim, both projected onto an XY plane.

FIG. 6 illustrates a travel path 41 of the axis of the stylus head, which extends along the inner peripheral groove of a frame rim, with reference to a three-dimensional coordinate system, and FIG. 7 illustrates the path 41 of the axis of the stylus head 32 and a contour 43 of the inner peripheral groove of the frame rim, both projected onto an XY plane.

First, the measured shape data (Rn, $\theta$n, Zn) (n=1, 2, 3, ..., N), represented by cylindrical coordinates, is transformed into orthogonal coordinates (Xsn, Ysn, Zn) (n=1, 2, 3, ..., N), based on a common origin 42 as shown in FIG. 6.

Subsequently, the contour 43 of the inner peripheral groove is computed based on the fact that the contour 43 has a shape obtained by deforming the path 41 of the axis of the stylus head 32 in the normal direction by an amount equal to the radius SR of the stylus 30, as shown in FIG. 7. Specifically, provided that the normal vector at a jth point (Xsj, Ysj) on the path 41 of the axis of the stylus head 32 is (SVxj, SVyj), orthogonal coordinates (Xj, Yj) of the corresponding point on the contour 43 of the inner peripheral groove can be obtained by adding the normal vector (SVxj, SVyj) to (Xsj, Ysj). This calculation is performed for j=1 through to j=N, thereby obtaining coordinates (Xn, Yn) (n=1, 2, 3, ..., N) of the points on the contour of the inner peripheral groove. The Z-axis coordinate Zn of the contour of the inner peripheral groove is equal to Zn in the orthogonal coordinates (Xsn, Ysn, Zn).

[S602] Even in the case where the same frame is measured, the edge of the stylus head 32 may be displaced and separated from the inner peripheral groove if a stylus of different shape is used, with the result that different data is obtained in Step S601 as the contour of the inner peripheral groove. Further, while the diametrical direction of the stylus head 32 is always on a plane perpendicular to the Z axis of the frame shape measuring apparatus 102 for reasons of mechanical design, the frame rim shape varies also in the Z-axis direction, and therefore, a portion of the inner peripheral groove may be inclined with respect to the plane perpendicular to the Z axis of the frame shape measuring apparatus 102. Also in this case, the edge of the stylus head 32 is displaced, depending on the inclination. In this Step S602, the circumferential shape of the bottom of the inner peripheral groove is obtained taking account of such displacement of the stylus, The step will be explained with reference to FIGS. 8 through 13.

Figure 8:
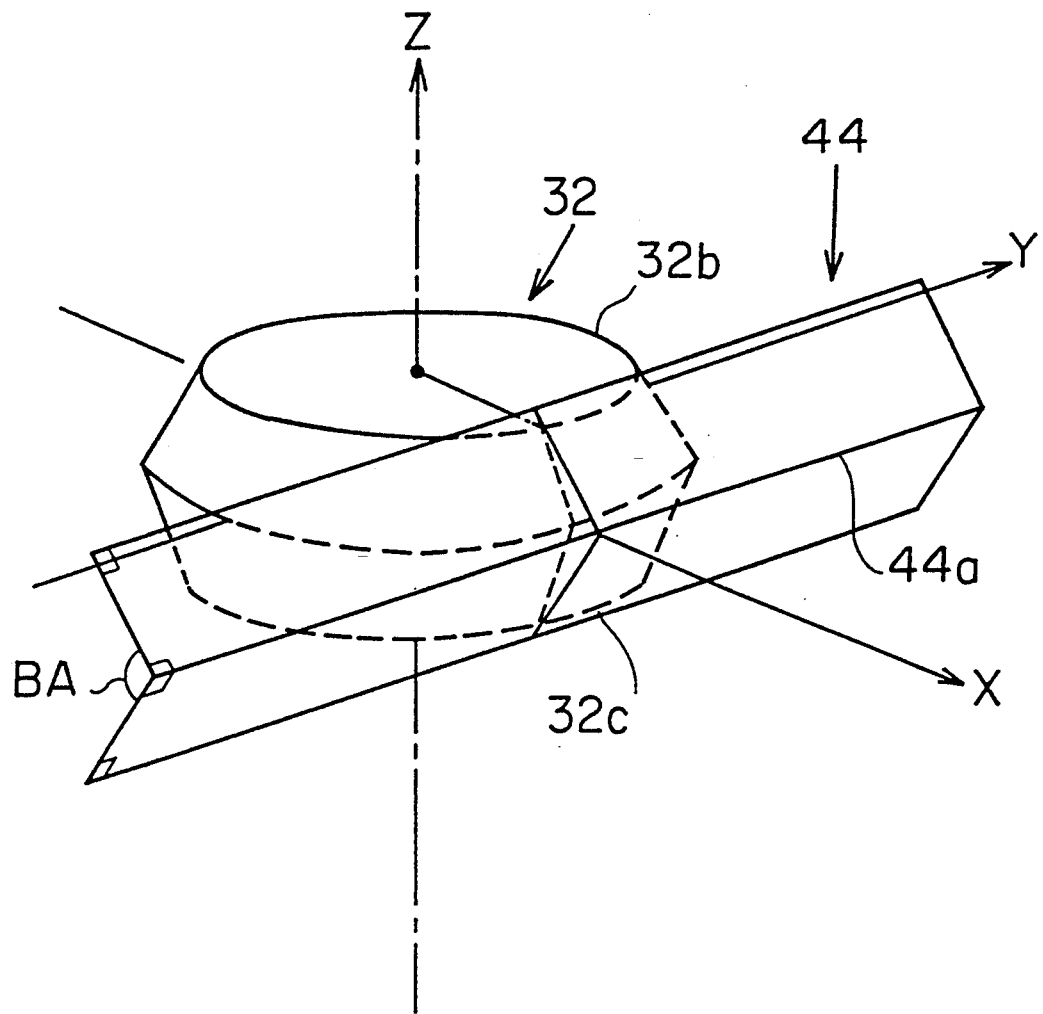
FIG. 8 is a perspective view showing the inner peripheral groove and the stylus head.
Figure 9:
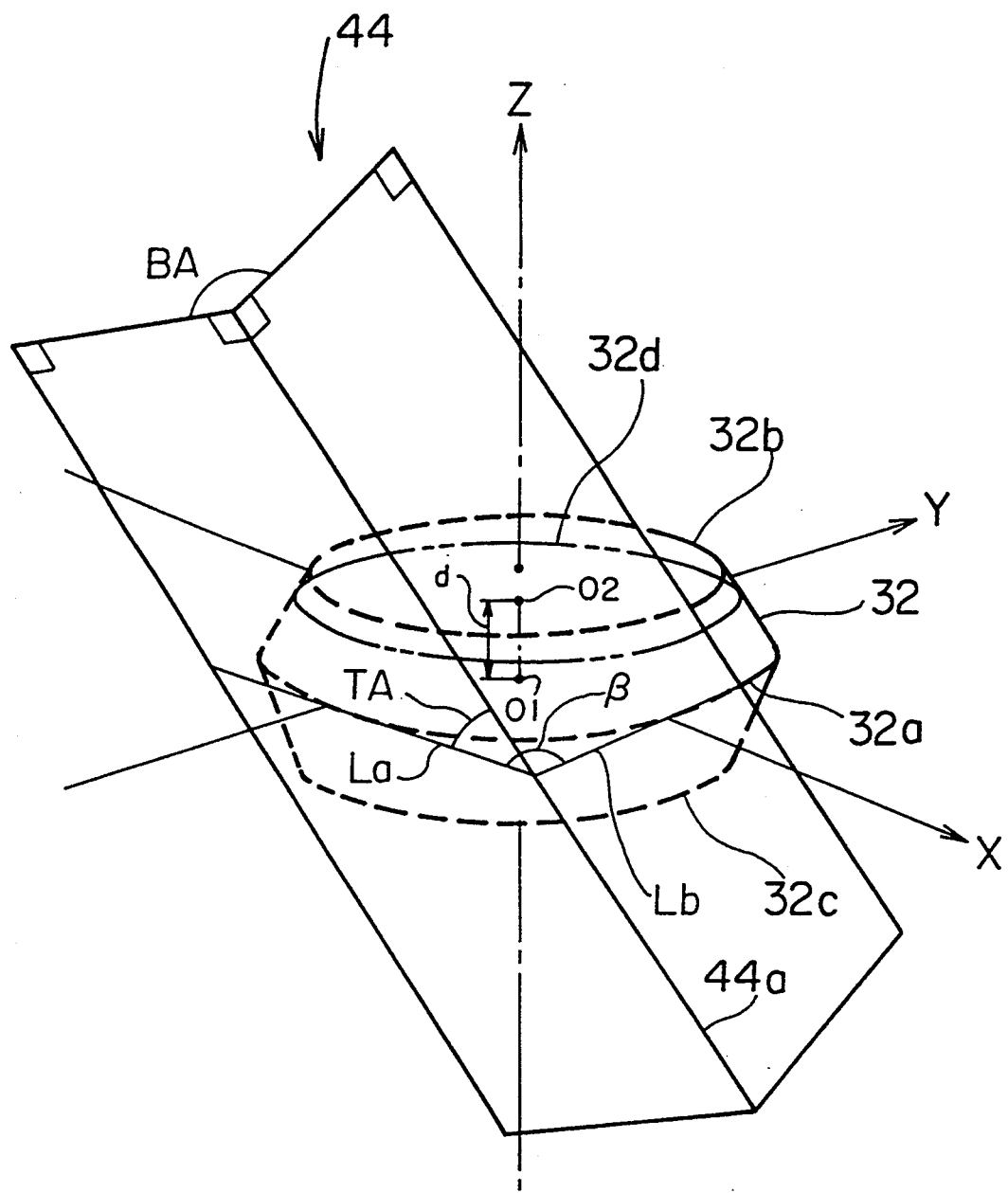
FIG. 9 is a perspective view showing the inner peripheral groove and the stylus head.
Figure 12A:
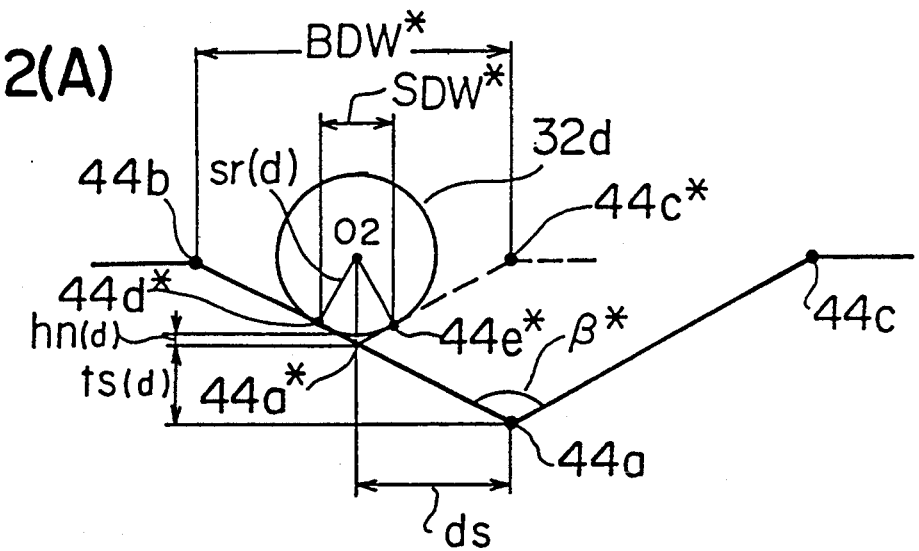
FIG. 12(A) is a diagram showing a plane containing a circle 32d shown in FIG. 9.
Figure 12B:
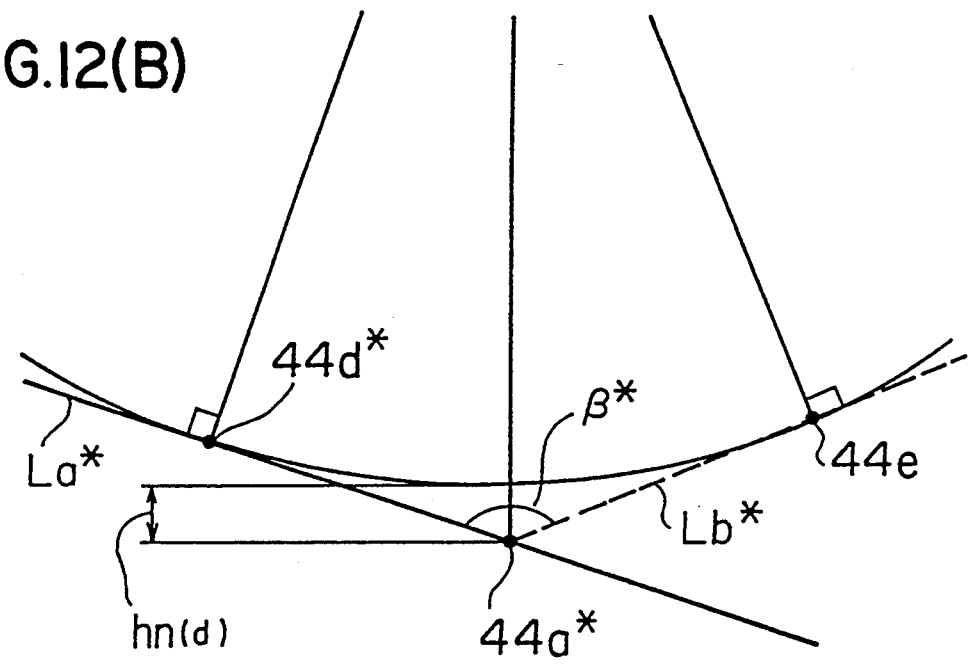
FIG. 12(B) is an enlarged view of a part shown in FIG. 12(A)
Figure 13:
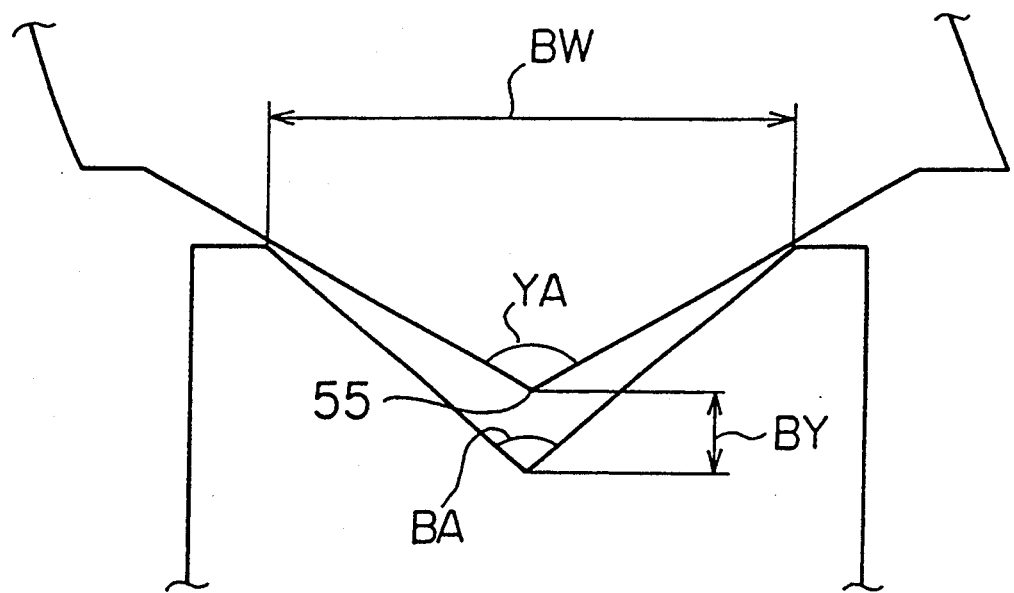
FIG. 13 is a ZX plan view showing a frame rim and a bevel of a lens.

FIGS. 8 and 9 each illustrate the inner peripheral groove 44 and the stylus head 32 in perspective. FIG. 8 illustrates the case wherein the frame rim shape involves no variation in the Z-axis direction but the edge of the stylus is unable to contact the bottom of the inner peripheral groove, and FIG. 9 illustrates the case wherein the frame rim shape varies in the Z-axis direction and thus the edge of the stylus is unable to contact the bottom of the inner peripheral groove. FIG. 10 is a ZX plan view of the inner peripheral groove 44 and the stylus head 32 shown in FIG. 8. FIG. 11 is an XY plan view of the inner peripheral groove 44 and the stylus head 32 shown in FIG. 9, and FIG. 12 shows the elements as viewed on a plane containing a circle 32d in FIG. 9. FIG. 13 is a ZX plan view showing the frame rim and the bevel of a lens.

In cases where the frame rim shape involves no variation in the Z-axis direction as shown in FIG. 8, the state of contact between the stylus head 32 and the inner peripheral groove 44 changes depending on the shape of the stylus head 32, even though the shape of the inner peripheral groove is the same, as shown in (A) to (C) of FIG. 10. Accordingly, the distance Hn between the center edge 32a of the stylus head 32 and the bottom 44a of the inner peripheral groove 44 is obtained from the angle BA and width BW of the inner peripheral groove, the angle SA of the edge of the stylus head 32, and the width SW of the stylus head 32.

Figure 10A:
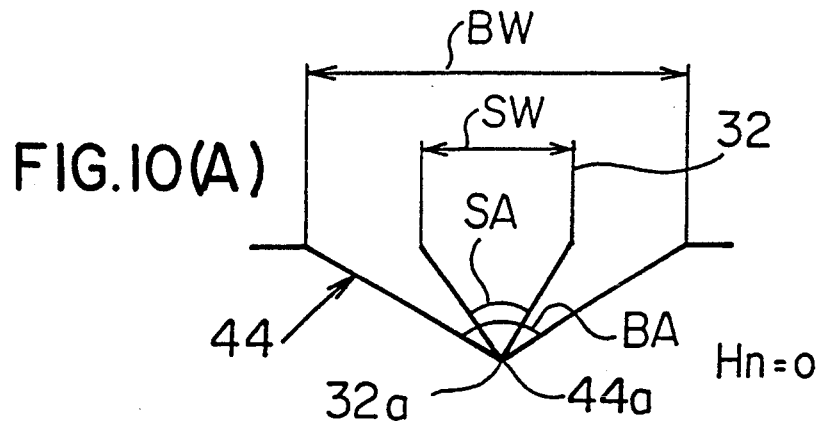
FIG. 10(A) is a ZX plan view of the inner peripheral groove and stylus head shown in FIG. 8, illustrating a case where the stylus head is small and an angle SA thereof also is small.

Specifically, when $SA \leq BA$ as shown in FIG. 10(A), $Hn = 0$ since the edge 32a of the stylus head 32 is always in contact with the bottom 44a of the inner peripheral groove 44.

Figure 10B:
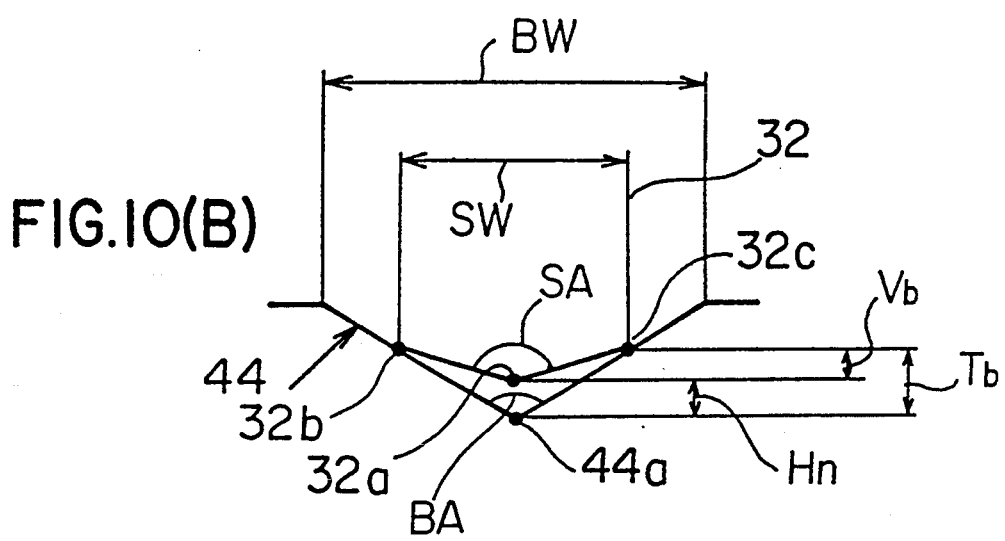
FIG. 10(B) is a ZX plan view of the inner peripheral groove and stylus head shown in FIG. 8, illustrating a case where the stylus head is small but the angle SA thereof is large.

When $SA > BA$ and $BW \geq SW$ as shown in FIG. 10(B), upper and lower edges 32b and 32c of the stylus head 32 contact the wall surfaces of the inner peripheral groove 44. Thus, a distance Vb is obtained from SW and SA, a distance Tb is obtained from SW and BA, and the distance Hn is calculated according to the following equation (1):

$$Hn = Tb - Vb \qquad (1)$$

Figure 10C:
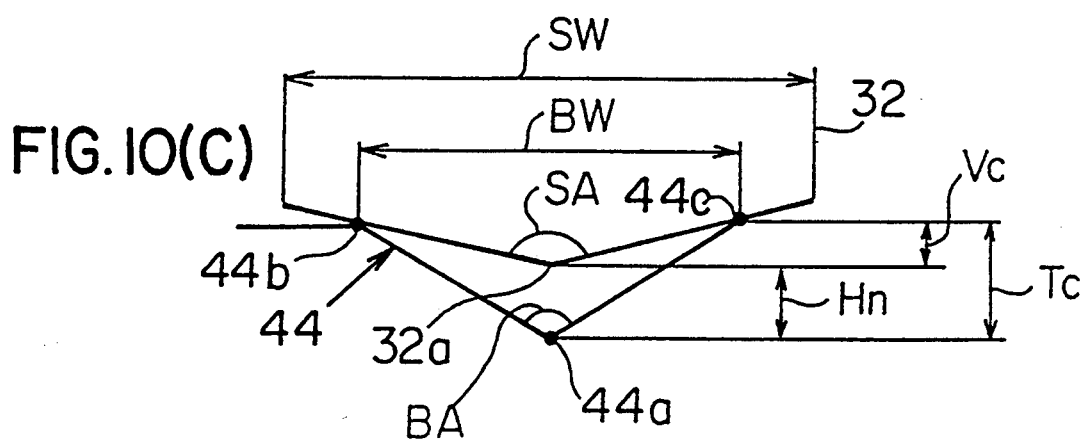
FIG. 10(C) is a ZX plan view of the inner peripheral groove and stylus head shown in FIG. 8, illustrating a case where the stylus head is large and the angle SA thereof also is large.

When $SA > BA$ and $BW < SW$ as shown in FIG. 10(C), the inclined surfaces of the stylus head 32 contact upper edges 44b and 44c of the inner peripheral groove 44. In this case, a distance Vc is obtained from BW and SA, a groove depth Tc is obtained from BW and BA, and the distance Hn is calculated according to the following equation (2):

$$Hn = Tc - Vc \qquad (2)$$

In cases where the shape of the frame rim varies in the Z-axis direction as shown in FIG. 9, the state of contact between the stylus head 32 and the inner peripheral groove 44 changes in accordance with an angle TA between the inner peripheral groove 44 and plane perpendicular to the Z axis. Since such change in the contact state causes an error in the calculation of the coordinates (Xn, Yn) of the inner peripheral groove contour in Step S601, the error need be corrected.

Specifically, when the angle SA of the center edge 32a of the stylus head 32 is smaller than or equal to the angle BA of the inner peripheral groove, the edge of the stylus head 32 invariably contacts the wall surfaces of the inner peripheral groove 44, regardless of the magnitude of the angle TA between the inner peripheral groove 44 and the plane perpendicular to the Z axis. Accordingly, error in the contact state between the edge of the stylus head 32 and the wall surfaces of the inner peripheral groove 44 alone need be corrected. First, based on the angle BA of the inner peripheral groove and the angle TA, an angle $\beta$ between two line segments La and Lb, which are formed by a plane containing the center edge 32a of the stylus head 32 (in FIG. 9, the plane containing the X and Y axes) and the inner peripheral groove 44 intersecting the plane, is obtained. Then, the distance Hn between the center edge 32a of the stylus head 32 and the bottom 44a of the inner peripheral groove 44 is obtained from the angle $\beta$ and the radius SR of the stylus head 32.

Namely, a distance SDW between two contact points 44d and 44e, at which a circle with a radius equal to the radius SR of the stylus head 32 contacts the two line segments La and Lb intersecting at the angle $\beta$, is obtained as shown in (A) and (B) of FIG. 11. Further, a distance BDW between the upper edges 44b and 44c of the inner peripheral groove 44 is obtained. In cases where the two line segments La and Lb do not contact the circle corresponding to the center edge 32a of stylus head 32, the distance SDW is obtained after subjecting the line segments to parallel translation such that they contact the circle.

Figure 11A:
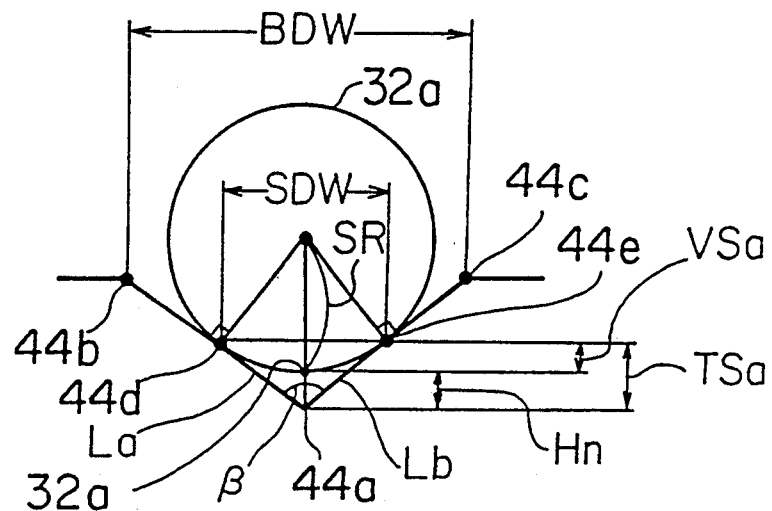
FIG. 11(A) is an XY plan view of the inner peripheral groove and stylus head shown in FIG. 9, illustrating a case where the edge of the stylus head is in contact with the wall of the inner peripheral groove.

When $BDW \geq SDW$ as shown in FIG. 11(A), the center edge 32a of the stylus head 32 contacts the wall surfaces of the inner peripheral groove 44 at the contact points 44d and 44e. Thus, a distance VSa is obtained from SDW and SR, a distance TSa is obtained from SDW and $\beta$, and the distance Hn is calculated according to the following equation (3):

$$Hn = TSa - VSa \qquad (3)$$

Figure 11B:
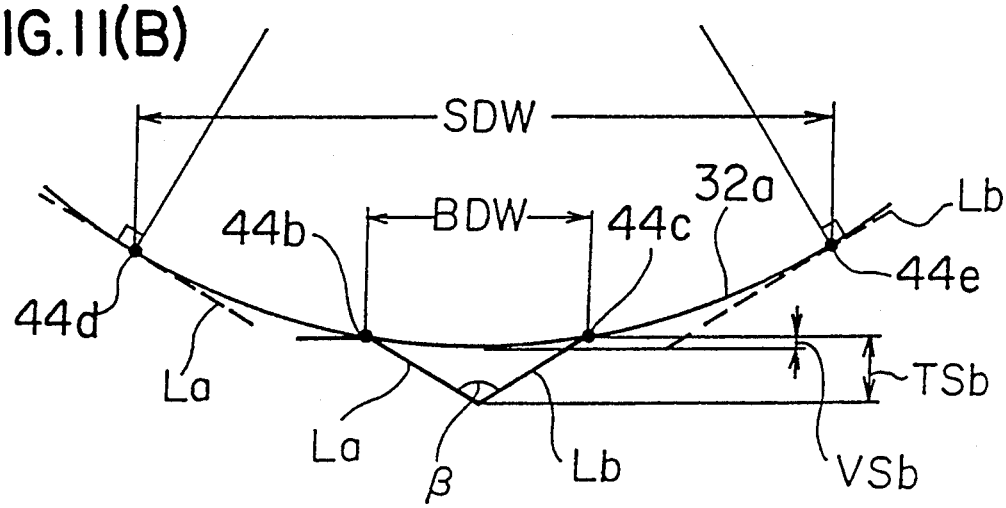
FIG. 11(B) is an XY plan view of the inner peripheral groove and stylus head shown in FIG. 9, illustrating a case where the edge of the stylus head is in contact with the upper edge of the inner peripheral groove.

When $BDW < SDW$ as shown in FIG. 11(B), the center edge 32a of the stylus head 32 contacts the upper edges 44b and 44c of the inner peripheral groove 44. Accordingly, a distance VSb is obtained from BDW and SR, a distance TSb is obtained from BDW and $\beta$, and the distance Hn is computed according to the following equation (4):

$$Hn = TSb - VSb \qquad (4)$$

The distance Hn is calculated along the entire circumference of the frame rim in the above-described manner, and is set as a correction amount Hn (n=1, 2, 3, ..., N).

In cases where the angle SA of the edge 32a of the stylus head 32 is greater than the angle BA of the inner peripheral groove, the upper and lower edges 32b and 32c of the stylus head 32 may contact the wall surfaces of the inner peripheral groove 44, depending on the angle TA between the inner peripheral groove 44 and the plane perpendicular to the Z axis, so that the center edge 32a of the stylus head 32 may fail to contact the wall surfaces of the inner peripheral groove 44. In such cases, the correction amount Hn (n=1, 2, 3, ..., N) is obtained taking account of the state of contact of the upper and lower edges 32b and 32c of the stylus head 32 with the wall surfaces of the inner peripheral groove 44.

Specifically, it is first determined where in the inclined surfaces between the center edge 32a and the upper and lower edges 32b and 32c the stylus head 32 contacts the wall surfaces of the inner peripheral groove 44. Since the shape of the stylus head 32 is symmetrical with respect to the center edge 32a, explanation is given with reference only to the inclined surface extending from the center edge 32a to the upper edge 32b of the stylus head 32.

It is here assumed that the center of the circumference of the center edge 32a of the stylus head 32 is O1, and that a circle 32d, which is on the upper side surface of the stylus head 32 and which has a center at a point O2 shifted from the center O1 in the Z-axis direction by a distance d, is in contact with the wall surfaces of the inner peripheral groove 44, as shown in FIG. 9. A plane containing the circle 32d (i.e., a plane parallel to the XY plane in FIG. 9) is illustrated in FIG. 12(A). FIG. 12(B) is an enlarged view of a part shown in FIG. 12(A).

Referring to FIG. 12, first, a horizontal distance ds from the bottom 44a of the inner peripheral groove 44 to the center O2 of the circle 32d is obtained. In the figure, the direction of the bisector of an angle β* between wall surface lines 44a–44b and 44a–44c of the inner peripheral groove 44 is called vertical direction, and the direction at right angles to the bisector is called horizontal direction. The distance ds is given by equation (5) below, based on the angle TA and the distance d.

$$ds = d/\tan TA \quad (5)$$

Provided the point at which the wall surface line 44a–44b of the inner peripheral groove 44 intersects a vertical line passing through the center O2 of the circle 32d is 44a*, a vertical distance ts(d) from the bottom 44a of the inner peripheral groove 44 to the point 44a* can be obtained from the distance ds and the angle β*. The distance ts(d) is a function of the parameter d.

Assuming that the point 44a* represents the bottom 44a of the inner peripheral groove 44 as shown in FIGS. 10 and 11, then the distance hn(d) between the lowermost point of the circle 32d and the point 44a* can be calculated by a method similar to the calculation method for the distance Hn, described with reference to FIGS. 10 and 11. The calculated distance hn(d) is a function of the parameter d. In FIG. 12, the elements with the sign "*" represent elements based on the above assumption and corresponding to those without asterisk shown in FIGS. 10 and 11.

Further, the vertical distance TO(d) from the center O2 of the circle 32d to the bottom 44a of the inner peripheral groove 44 is computed according to the following equation (6):

$$TO(d) = sr(d) + hn(d) + ts(d) \quad (6)$$

where sr(d) is the radius of the circle 32d expressed using the parameter TO(d) is a function of the parameter d.

Then, assuming that the circle 32d is shifted from the center edge 32a (d=0) to the upper edge 32b (d=SW/2) of the stylus head value d0 of the distance d at which the distance TO(d) becomes a maximum is obtained. That circle along the side surface of the stylus head 32 which has its center at a point shifted by the distance d0 is a circle actually contacting the wall surface of the inner peripheral groove 44.

The distance Hn in this case is calculated by the following equation (7):

$$Hn = TO(d0) \quad (7)$$

The situation explained with reference to FIG. 12 rarely occurs, and thus the process concerned may be omitted in order to increase the computation speed.

When carrying out the beveling step, figure of a bevel edge is required which is based on the assumption that a beveled lens having such figure is fittable in the measured frame rim. This figure is hereinafter called bevel edge shape. The position 55 of the bevel edge figure is at constant distance from the bottom of the inner peripheral groove if the angle BA and width BW of the inner peripheral groove and the vertex angle YA of the bevel are determined, as shown in FIG. This distance is hereinafter referred to as bevel-groove distance BY. To obtain a final frame rim shape based on the bevel edge figure, the bevel-groove distance BY is subtracted from the obtained correction amount Hn (n=1, 2, 3, ..., N) and the result is set as a new correction amount Hn (n=1, 2, 3, ..., N).

Figure 11C:
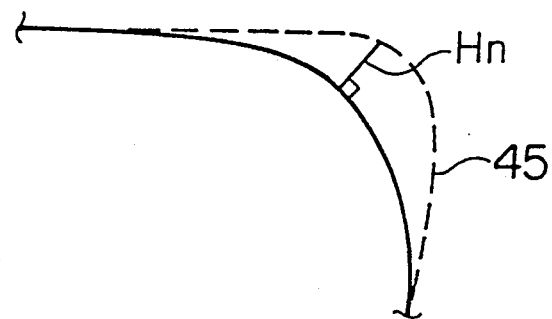
FIG. 11(C) is an XY plan view illustrating the relationship between the contour of the inner peripheral groove and a correction amount.

Since the direction of correction by means of the correction amount Hn is identical with the normal direction of a shape obtained by projecting the coordinates of the contour of the inner peripheral groove, (Xn, Yn, Zn), onto the XY plane, as shown in FIG. 11(C), a corrected shape 45 is obtained through deformation in the normal direction by the correction amount Hn and is set as frame rim shape coordinates (Xn, Yn, Zn) (n=1, 2, 3, ..., N).

If the stylus head has a symmetrical shape with respect to the Z axis, like the stylus head 32 of this embodiment having a shape resembling an abacus bead, and if its sectional shape containing the axis of rotation symmetry is previously known, the contact state between the stylus head and the inclined inner peripheral groove 44 can be acquired by computation. Thus, correction similar to the above can be implemented.

[S603] Based on the frame rim shape coordinates (Xn, Yn, Zn) (n=1, 2, 3, ..., N) corrected in Step S602, the circumference FLN of the frame rim shape (i.e., the circumference of the bottom of the inner peripheral groove) is calculated. The circumference FLN of the frame rim shape is given as a summation of distances between adjacent ones of points on the frame rim shape, as indicated by the following equation (8):

$$FLN = \Sigma[((X_i - X_{i+1})^2 + (Y_i - Y_{i+1})^2 + (Z_i - Z_{i+1})^2)^{\frac{1}{2}}] (i=1 \ldots N) \quad (8)$$

In equation (8), when i=N, "1" is used for (i+1).

[S604] Generally, when the frame is held by the frame shape measuring apparatus 102 for the measurement of the frame rim shape, the forward directions of the right and left frame rims are individually inclined with respect to the Z axis of the measuring apparatus 102. To recognize the inclinations, a vector in the forward direction of each of the right and left frame rims is determined.

In the present invention, the forward direction of the frame rim is defined as follows: First, a two-dimensional shape of the frame rim is obtained by projecting the frame rim shape onto a plane, and the direction perpendicular to the plane when the area of the projected two-dimensional shape is a maximum is considered the forward direction of the frame rim. The forward direction of the frame rim can be defined in various ways.

Figure 14:
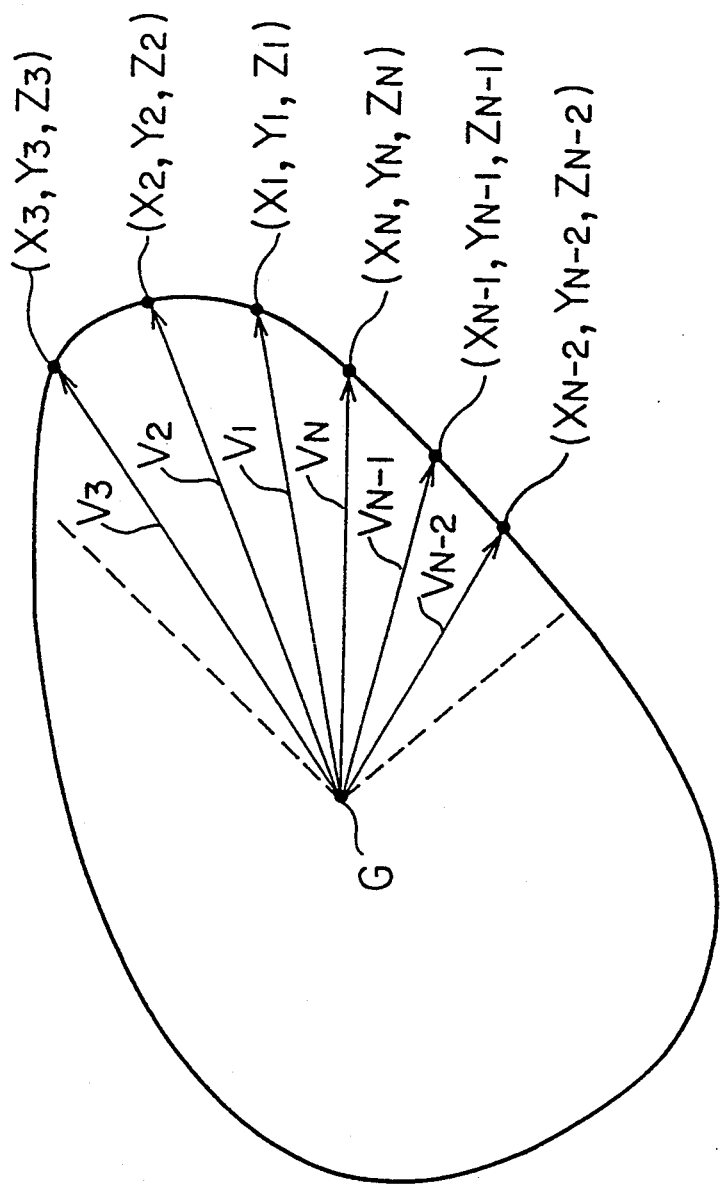
FIG. 14 is a diagram illustrating vectors directed from a point approximately at the center of a frame rim to respective coordinates of a frame rim shape.

FIG. 14 illustrates an example of a stringent definition method, in which are shown vectors $V_n$ (n=1, 2, 3, ..., N) individually having a start point G at approximately the center of the frame rim shape coordinates (e.g., the centroid given as a weighted mean of the X-, Y- and Z-axis components of the frame rim shape coordinates) and having respective end points at the corresponding frame rim shape coordinates (Xn, Yn, Zn) (n=1, 2, 3, ..., N). A unit vector FV in the forward direction of the frame rim can be obtained according to equation (9) below, using the vector $V_n$ (n=1, 2, 3, ..., N).

$$FV = \Sigma(V_i \times V_{i+1}) / \| \Sigma(V_i \times V_{i+1}) \| \quad (i=1 \ldots N) \qquad (9)$$

where "x" indicates that an outer product of vectors is obtained, and when i=N, "1" is used for (i+1)

The forward direction of the frame rim can also be obtained by means of approximation. In this embodiment, an approximation method is used, and the method will be explained with reference to FIG. 15.

Figure 15:
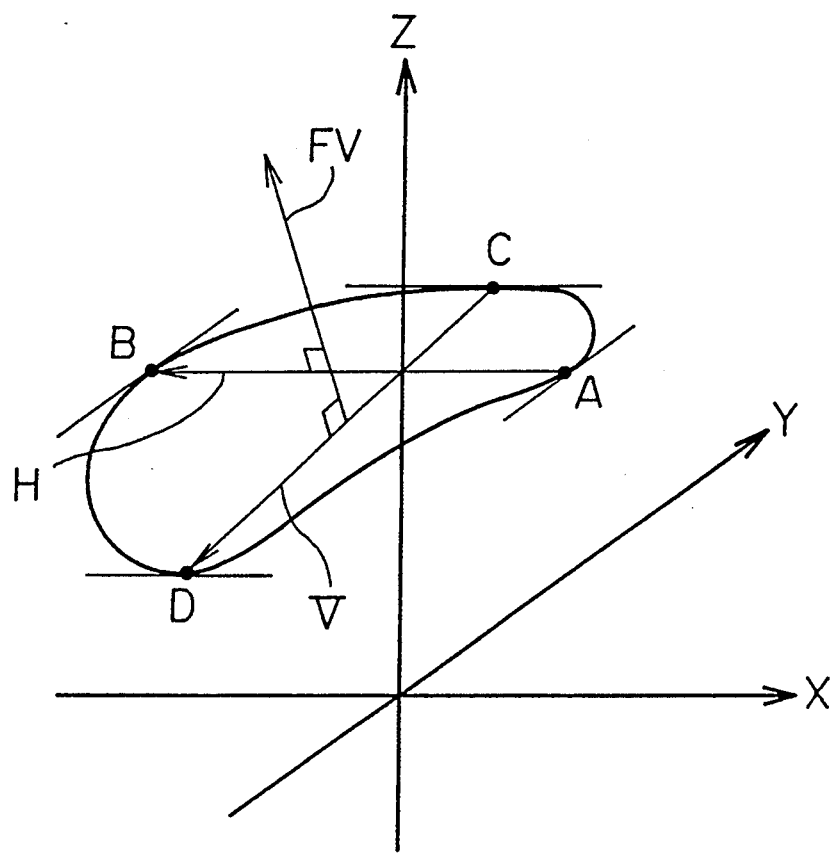
FIG. 15 is a diagram showing the forward direction of a frame rim.

FIG. 15 illustrates the forward direction of a frame rim in perspective. First, it is assumed that, among the frame rim shape coordinates (Xn, Yn, Zn) (n=1, 2, 3, ..., N) corrected in Step S602, a point on the frame rim shape whose Xn value is a maximum is A, a point on the frame rim shape whose Xn value is a minimum is B, a point on the frame rim shape whose Yn value is a maximum is C, and a point on the frame rim shape whose Yn value is a minimum is D. The vector directed from the point A to the point B is called vector H, and the vector directed from the point C to the point D is called vector V. In this case, the unit vector FV in the forward direction of the frame rim is defined as a vector perpendicular to these vectors H and V, and the vector FV is calculated.

[S605] It is determined whether Steps S601 through S604 have been executed for the measurement data of both the right and left frame rim shapes. If YES in Step S605, the program proceeds to Step S606, and if NO, the program returns to Step S601.

[S606] The coordinates (Xn, Yn, Zn) (n=1, 2, 3, ..., N) of the right and left frame rim shapes, obtained till this stage, are based on different origins, and thus are transformed into coordinates based on the same coordinate system with a single origin, using the aforementioned relative position data (δX, δY, δZ). The transformation will be described with reference to FIG. 16.

Figure 16:
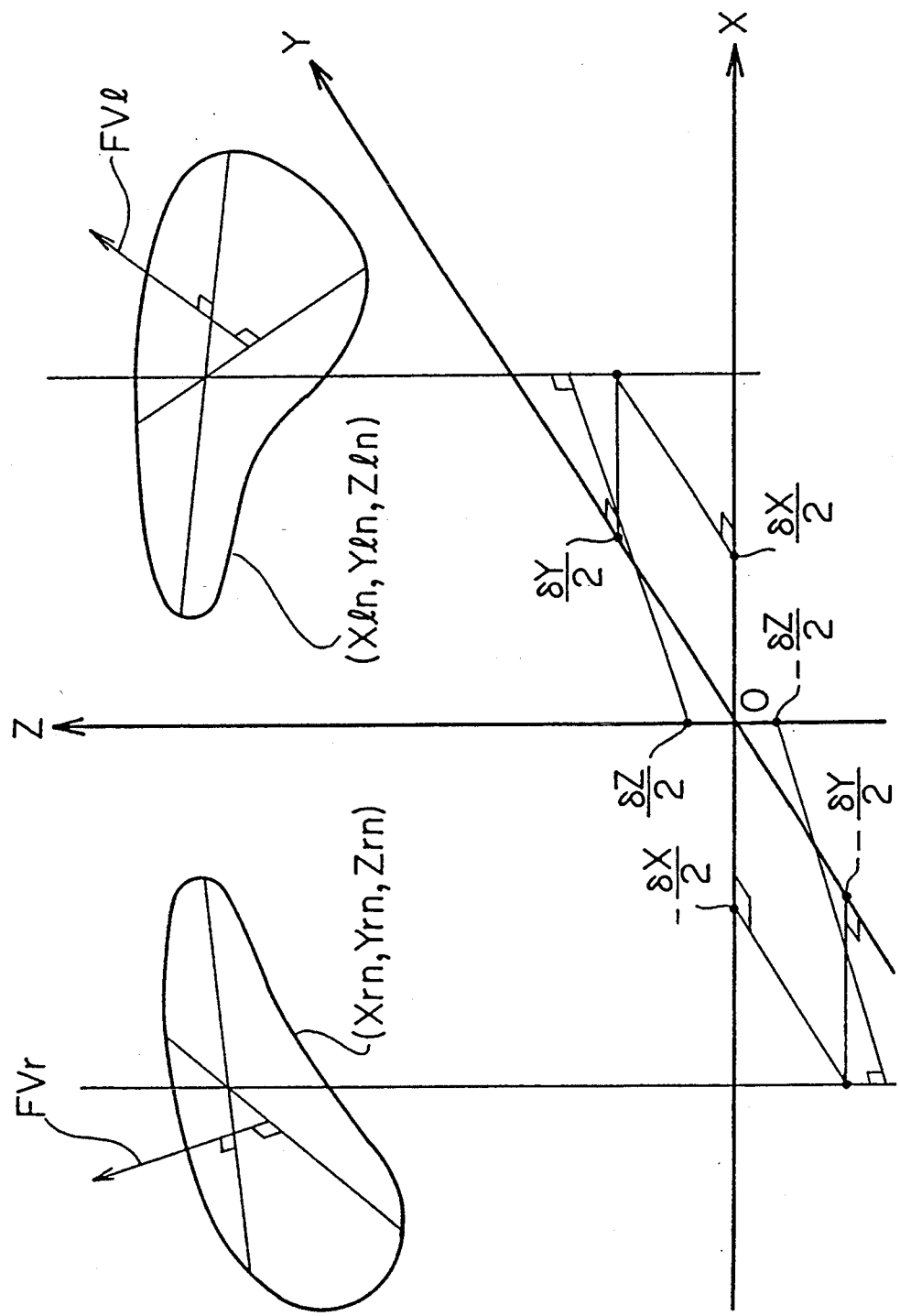
FIG. 16 is a diagram showing right and left frame rims positioned in a single three-dimensional orthogonal coordinate system.

FIG. 16 is a perspective view of right and left frame rims positioned in an identical three-dimensional orthogonal coordinate system. First, the coordinates (Xn, Yn, Zn) (n=1, 2, 3, ..., N) of the right frame rim shape are translated parallel in the X-, Y- and Z-axis directions by −δX/2, −δY/2, and −δZ/2, respectively, and the resulting coordinates are set as right frame rim shape coordinates (Xrn, Yrn, Zrn) (n=1, 2, 3, ..., N). The unit vector in the forward direction of the translated coordinates is set as FVr.

Then, the coordinates (Xn, Yn, Zn) (n=1, 2, 3, ..., N) of the left frame rim shape are translated parallel in the X-, Y- and Z-axis directions by δX/2, δY/2, and δZ/2, respectively, and the resulting coordinates are set as left frame rim shape coordinates (Xln, Yln, Zln) (n=1, 2, 3, ..., N). The unit vector in the forward direction of the translated coordinates is set as FVl.

[S607] Based on the unit vectors FVr and FVl in the respective forward directions of the right and left frame rims obtained in Step S606, a forward direction of the spectacles is calculated, and then the coordinates (Xrn, Yrn, Zrn) and (Xln, Yln, Zln) of the right and left frame rim shapes and the unit vectors FVr and FVl are rotated such that the forward direction of the spectacles coincides with the Z axis. This step will be explained with reference to FIG. 17.

Figure 17:
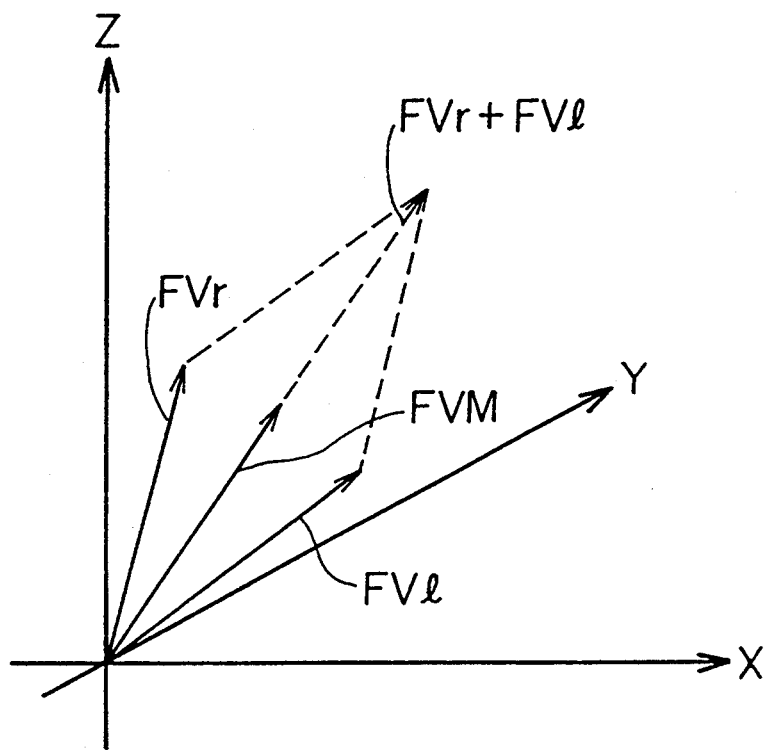
FIG. 17 is a diagram illustrating unit vectors in the respective forward directions of right and left frame rims and a unit vector in the forward direction of spectacles.

FIG. 17 shows the unit vectors FVr and FVl in the forward directions of the right and left frame rims and a unit vector FVM in the forward direction of the spectacles.

In this embodiment, the forward direction of the spectacles is defined as a direction of the resultant of the unit vectors FVr and FVl in the forward directions of the right and left frame rims, on the assumption that the right and left frame rims are inclined at the same angle with respect to a frame plane (i.e., a plane perpendicular to the forward direction of the spectacles) when the frame is worn. Namely, the resultant vector is defined as the unit vector FVM in the forward direction of the spectacles.

Subsequently, the coordinates of the right frame rim shape (Xrn, Yrn, Zrn) (n=1, 2, 3, ..., N), the coordinates of the left frame rim shape (Xln, Yln, Zln) (n=1, 2, 3, ..., N), and the unit vectors FVr and FVl in the forward directions of the right and left frame rims are rotated about the origin such that the forward direction of the spectacles coincides with the Z axis, to obtain new transformed values.

[S608] Based on the coordinates (Xrn, Yrn, Zrn) and (Xln, Yln, Zln) of the right and left frame rim figures transformed in Step S607, an angle θd formed on the XY plane between a datum line of the spectacles and the X axis is obtained, and the coordinates (Xrn, Yrn, Zrn) and (Xln, Yln, Zln) of the right and left frame rim shapes and the unit vectors FVr and FVl are transformed such that the datum line coincides with the X axis. Specifically, first, using two-dimensional shapes obtained by projecting the right and left frame rim shapes onto a plane perpendicular to the calculated forward direction of the spectacles, the direction of a vector, which is the resultant of a unit vector having the same direction as a tangential line tangent to the uppermost points of the right and left frame rims and a unit vector having the same direction as a tangential line tangent to the lowermost points of the right and left frame rims, is calculated as representing the direction of the datum line of the spectacles. The calculation procedure will be explained with reference to FIG. 18.

Figure 18:
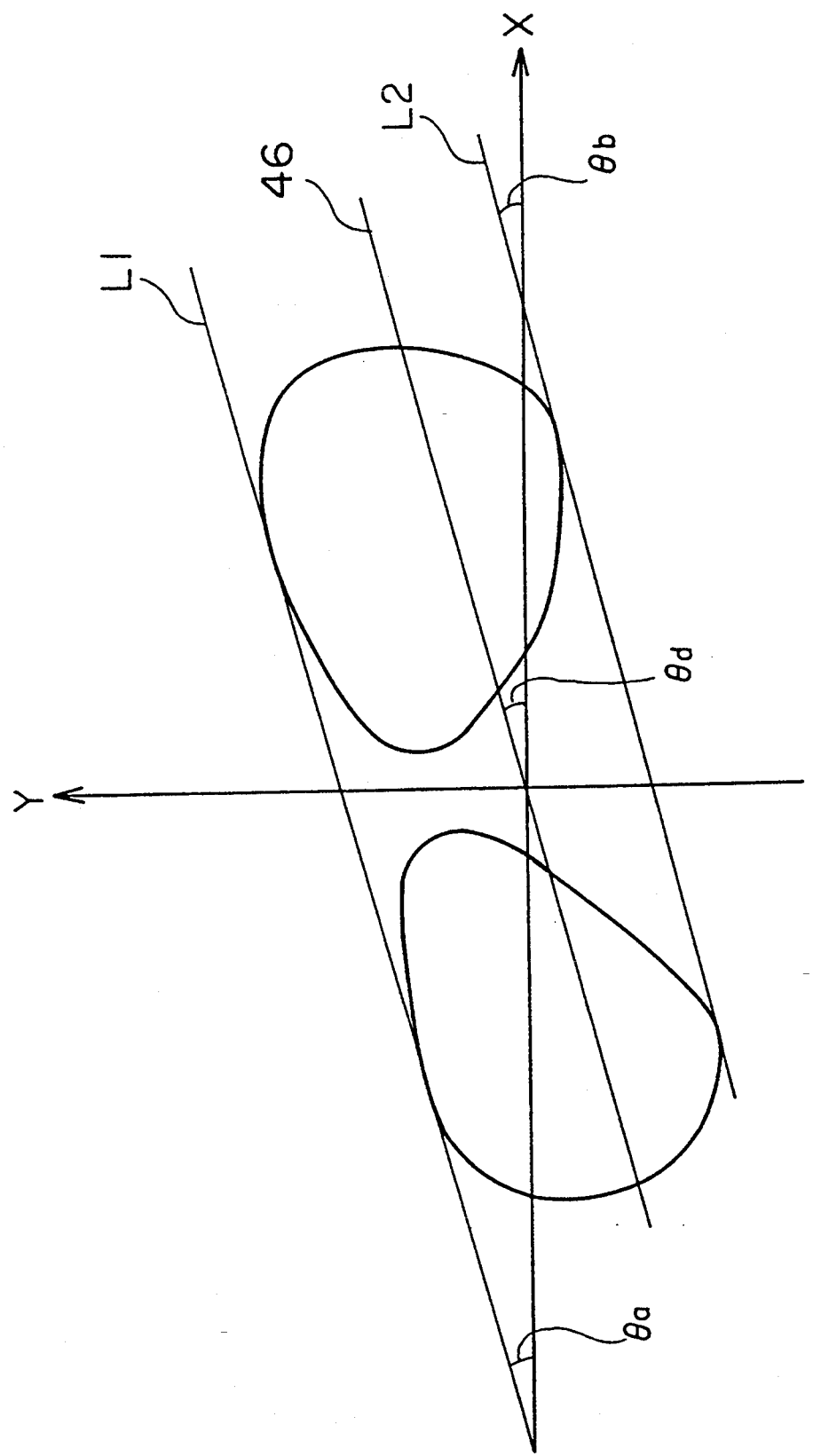
FIG. 18 is a plan view showing the shapes of right and left frame rims projected onto the XY plane.

FIG. 18 is a plan view of the right and left frame rim shapes projected onto the XY plane (plane perpendicular to the forward direction of the spectacles).

First, an angle θa between the X axis and an upper tangential line L1 tangent to both of the uppermost points of the right and left frame rim shapes and an angle θb between the X axis and a lower tangential line L2 tangent to both of the lowermost points of the right and left frame rim shapes are obtained. Since the angle θd between the datum line 46 of the spectacles and the X axis is an intermediate angle between the angles θa and θb, the angles θa and θb are averaged, and the average value obtained is set as the angle θd.

Subsequently, the coordinates of the right frame rim shape (Xrn, Yrn, Zrn) (n=1, 2, 3, ..., N), the coordinates of the left frame rim shape (Xln, Yln, Zln) (n=1, 2, 3, ..., N) and the unit vectors FVr and FVl in the forward directions of the right and left frame rims, which have been transformed in Step S607, are rotated through the angle θd about the Z axis such that the datum line of the spectacles coincides with the X axis, to thereby obtain new transformed values.

[S609] Based on the coordinates (Xrn, Yrn, Zrn) and (Xln, Yln, Zln) of the right and left frame rim shapes transformed in Step S608, the distance between the frame rims (i.e., inter-rim distance) is calculated. This calculation will be explained with reference to FIG. 19.

Figure 19:
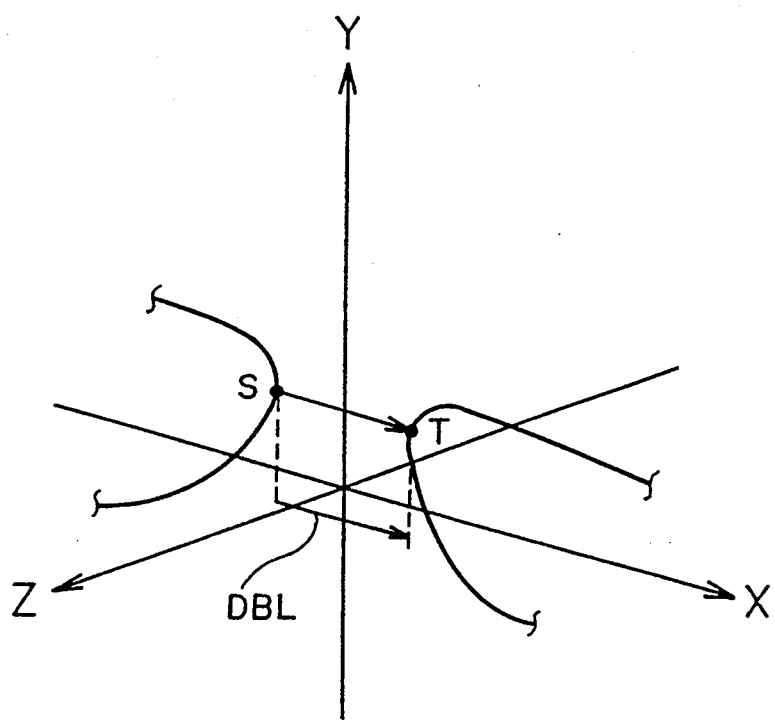
FIG. 19 is a perspective view of right and left frame rims, illustrating the distance between the frame rims.

FIG. 19 is a perspective view of the right and left frame rims, illustrating the inter-rim distance. Among the coordinates (Xrn, Yrn, Zrn) of the right frame rim shape, a point S whose Xrn value is a maximum is obtained, and among the coordinates (Xln, Yln, Zln) of the left frame rim shape, a point T whose Xln value is a minimum is obtained. Then, the length DBL of a vector, which is obtained by projecting the vector directed from the point S to the point T onto the ZX plane, is computed. The length DBL denotes a nose width, and in this embodiment, the inter-rim distance is represented by the nose width DBL.

The inter-rim distance is calculated in this manner, and accordingly, an accurate inter-rim distance can be obtained regardless of the mounting position of the frame with respect to the frame shape measuring apparatus 102, that is, even if the forward direction of the spectacles does not coincide with the Z axis of the frame shape measuring apparatus 102.

Figure 20:
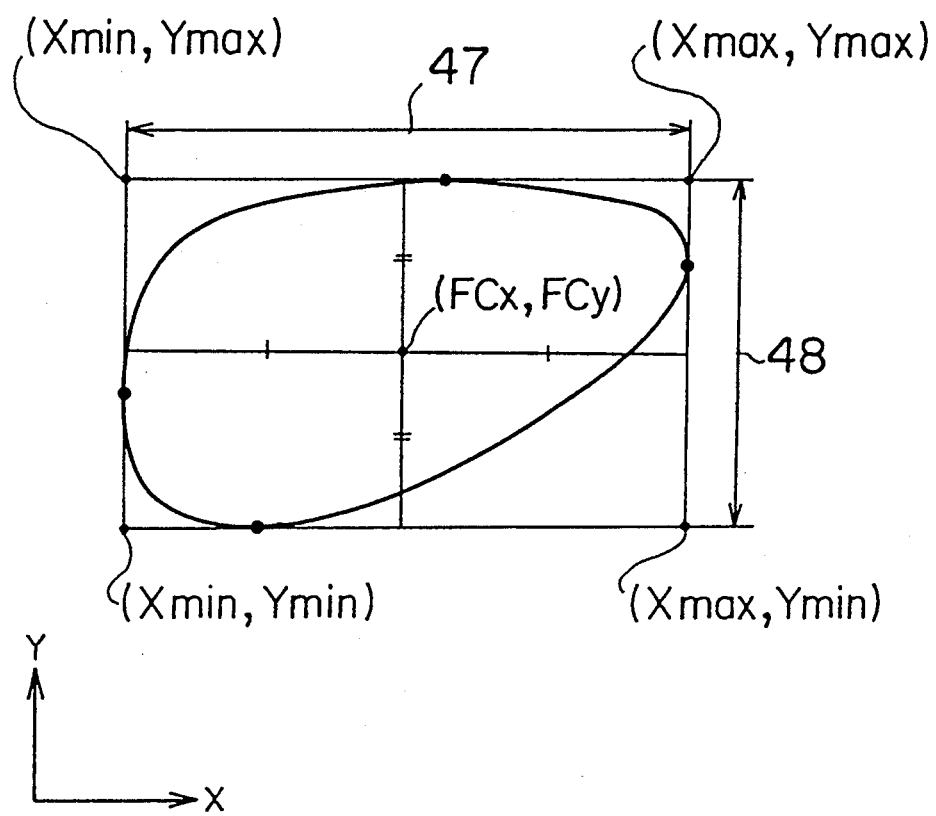
FIG. 20 is an XY plan view showing the shape of a frame rim after a transformation such that the forward direction of the frame rim coincides with a Z-axis.

[S610] Based on the coordinates (Xrn, Yrn, Zrn) and (Xln, Yln, Zln) of the right and left frame rim shapes and the unit vectors FVr and FVl in the forward directions of the frame rims which have been transformed in Step S608, dimensions A and B and coordinates of the geometrical center (frame center) of each of the right and left frame rims are calculated, Also, the coordinates (Xrn, Yrn, Zrn) and (Xln, Yln, Zln) of the right and left frame rim shapes are transformed into coordinates with reference to respective coordinate systems each having an origin at the calculated geometrical center and a Z axis aligned with the corresponding one of the unit vectors FVr and FVl in the forward directions of the right and left frame rims, The procedure will be explained with reference to FIG. 20. Since distinction between the right and left sides is not required when explaining Steps S610 to S612, the coordinates of the frame rim figures and the unit vectors in the forward directions of the frame rims are expressed as (Xn, Yn, Zn) (n=1, 2, 3, ..., N) and FV, respectively, and it is to be understood that they represent the corresponding data related to both the right and left frame rims, FIG. 20 illustrates a frame rim shape on the XY plane after the transformation such that the forward direction of the frame rim is aligned with the Z axis.

First, the coordinates (Xn, Yn, Zn) (n=1, 2, 3, ..., N) of the frame rim shape are rotated about the origin such that the unit vector FV in the forward direction of the frame rim coincides with the Z axis. Provided that, among the rotated coordinates (Xn, Yn, Zn), maximum and minimum Xn values are Xmax and Xmin, respectively, and maximum and minimum Yn values are Ymax and Ymin, respectively, then the dimension A (47) of the frame rim shape is given as the absolute value of the difference between Xmax and Xmin, and the dimension B (48) is given as the absolute value of the difference between Ymax and Ymin.

Coordinates (FCx, FCy) of the geometrical center (frame center) are given by the following equations (10) and (11):

$$FCx = (Xmax + Xmin)/2 \qquad (10)$$

$$FCy = (Ymax + Ymin)/2 \qquad (11)$$

Next, the transformed coordinates (Xn, Yn, Zn) (n=1, 2, 3, ..., N) of the frame rim shape are again transformed into coordinates with reference to a coordinate system having an origin at the geometrical center (FCx, FCy) such that the unit vector FV in the forward direction of the frame rim coincides with the Z axis.

Further, two-dimensional data (Xn, Yn) (n=1, 2, 3, ..., N) given by the coordinates (Xn, Yn, Zn) (n=1, 2, 3, ..., N) of the frame rim shape are transformed into polar coordinates (Rn, θn) (n=1, 2, 3, ..., N) based on a coordinate system having an origin at the geometrical center (FCx, FCy).

Among the polar coordinates (Rn, θn), a maximum Rn value is acquired, and then is doubled to obtain an effective diameter ED.

[S611] Assuming that the coordinates (Xn, Yn, Zn) (n=1, 2, 3, ..., N) having the origin at the geometrical center, obtained in Step S610, form a closed curve lying approximately on a torical surface, an equation for deriving such torical surface is established. The procedure will be explained with reference to FIG. 21.

Figure 21:
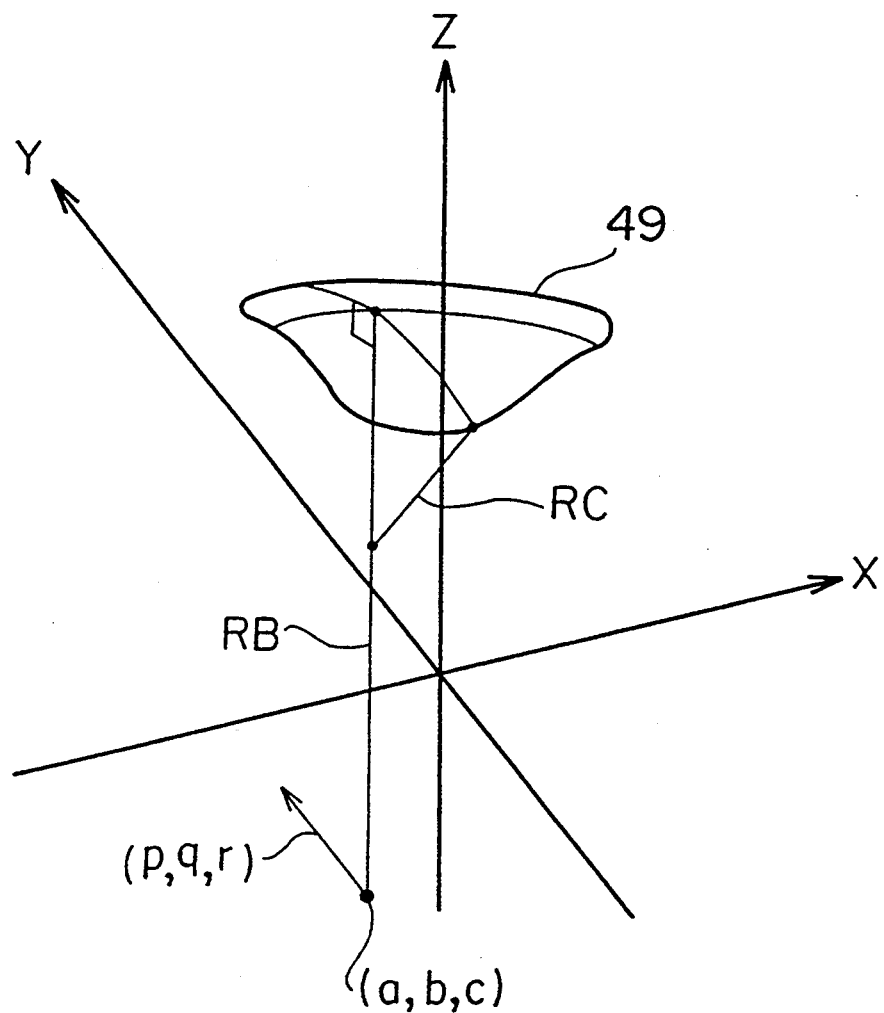
FIG. 21 is a perspective view of a frame rim, illustrating how a torical surface equation is derived.

FIG. 21 is a perspective view of the frame rim 49, illustrating the procedure for deriving the torical surface equation. In the figure, coordinates of the center of the torical surface are indicated by (a, b, c), and a unit vector in the direction of rotation symmetry of the torical surface is indicated by (p, q, r). Also, the radius of the largest circle obtained when the torical surface is sectioned by a plane containing the coordinates (a, b, c) and perpendicular to the unit vector (p, q, r) is referred to as base radius RB, and the radius of a circle obtained when the torical surface is sectioned by a plane containing the coordinates (a, b, c) and parallel with the unit vector (p, q, r) is referred to as cross radius RC.

To define the torical surface with reference to a three-dimensional coordinate system, the torical surface equation, which includes the center coordinates (a, b, c), base radius RB, cross radius RC, and unit vector (p, q, r) as variables, is solved by an approximation method of least square, using the coordinate data (Xn, Yn, Zn) (n=1, 2, 3, ..., N) of the frame rim shape, to thereby obtain the center coordinates (a, b, c), base radius RB, cross radius RC, and unit vector (p, q, r) in the direction of the rotation symmetry.

[S612] Using the unit vector FV in the forward direction of the frame rim transformed in Step S608, an inclination TILT of the frame rim is computed. This calculation will be explained with reference to FIG. 22.

Figure 22A:
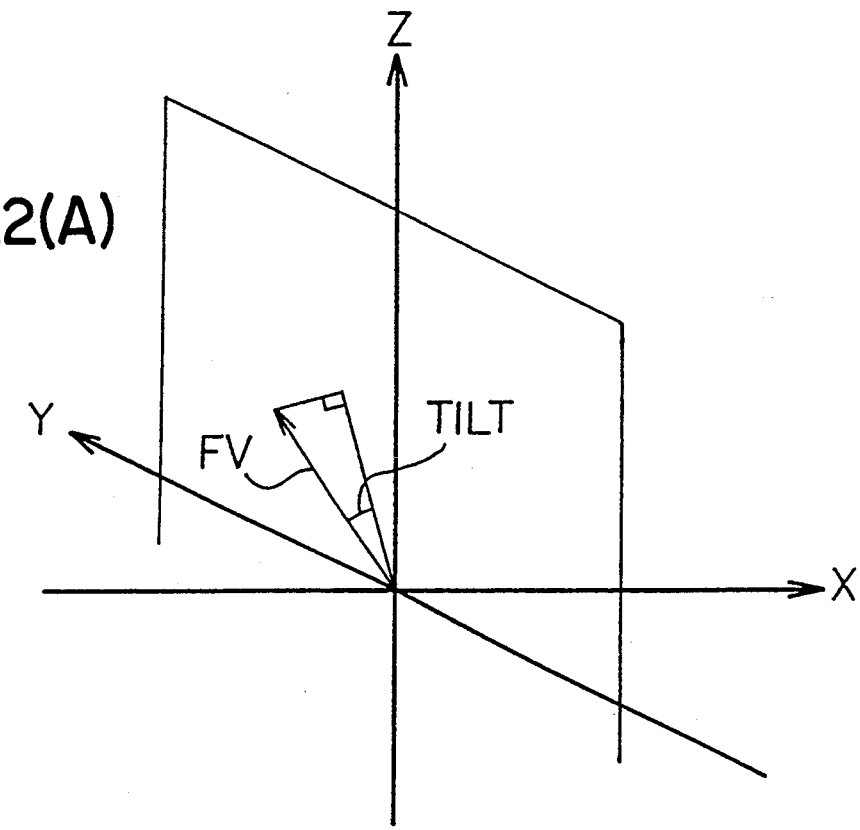
FIG. 22(A) is a diagram illustrating an inclination TILT of a frame rim and a procedure for calculating the inclination of the frame rim and a frame PD.
Figure 22B:
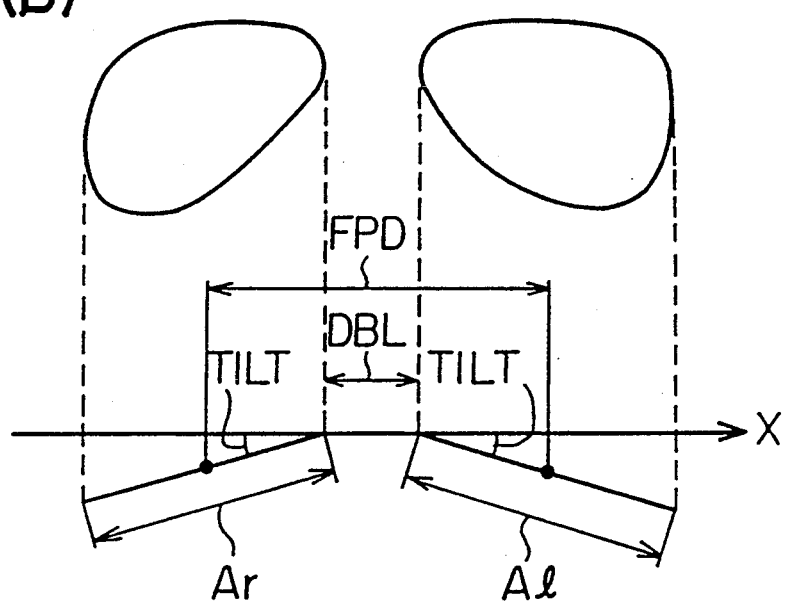
FIG. 22(B) is a plan view of frame rims, illustrating a procedure for calculating the inclinations of the frame rims and the frame PD.

FIG. 22 illustrates procedures for calculating the inclination TILT of the frame rim and a frame PD, wherein FIG. 22(A) shows the inclination TILT of the frame rim in perspective, and FIG. 22(B) is a plan view of the frame rims. As seen from FIG. 22(A), the inclination TILT of the frame rim is computed as an angle between the unit vector FV in the forward direction of the frame rim and a YZ plane.

Since the inclination TILT of the frame rim is calculated in this manner, an accurate inclination of the frame rim can be obtained regardless of the mounting position of the frame with respect to the frame shape measuring apparatus 102, that is, even if the forward direction of the spectacles does not coincide with the Z axis of the frame shape measuring apparatus 102.

Subsequently, based on the inclination TILT, and the nose width DBL and the dimension A obtained in Steps S609 and S610, respectively, the frame PD or the distance between the geometrical centers is computed. Specifically, the dimension A of the right frame rim differs from that of the left frame rim, as shown in FIG. 22(B), and therefore, the frame PD (FPD) is calculated according to equation (12) below.

$$FPD = (Ar + Al)/2 \cdot \cos(TILT) + DBL \quad (12)$$

where Ar and Al represent the dimensions A of the right and left frame rims, respectively.

[S613] Although it is desirable that the right and left frame rims should have the same shape, usually there is a slight difference of shape between the right and left frame rims. Accordingly, a merging process for merging the shapes of the right and left frame rims is carried out to make the right and left frame rims well-balanced. The merging process will be described in detail with reference to FIG. 23.

Figure 23:
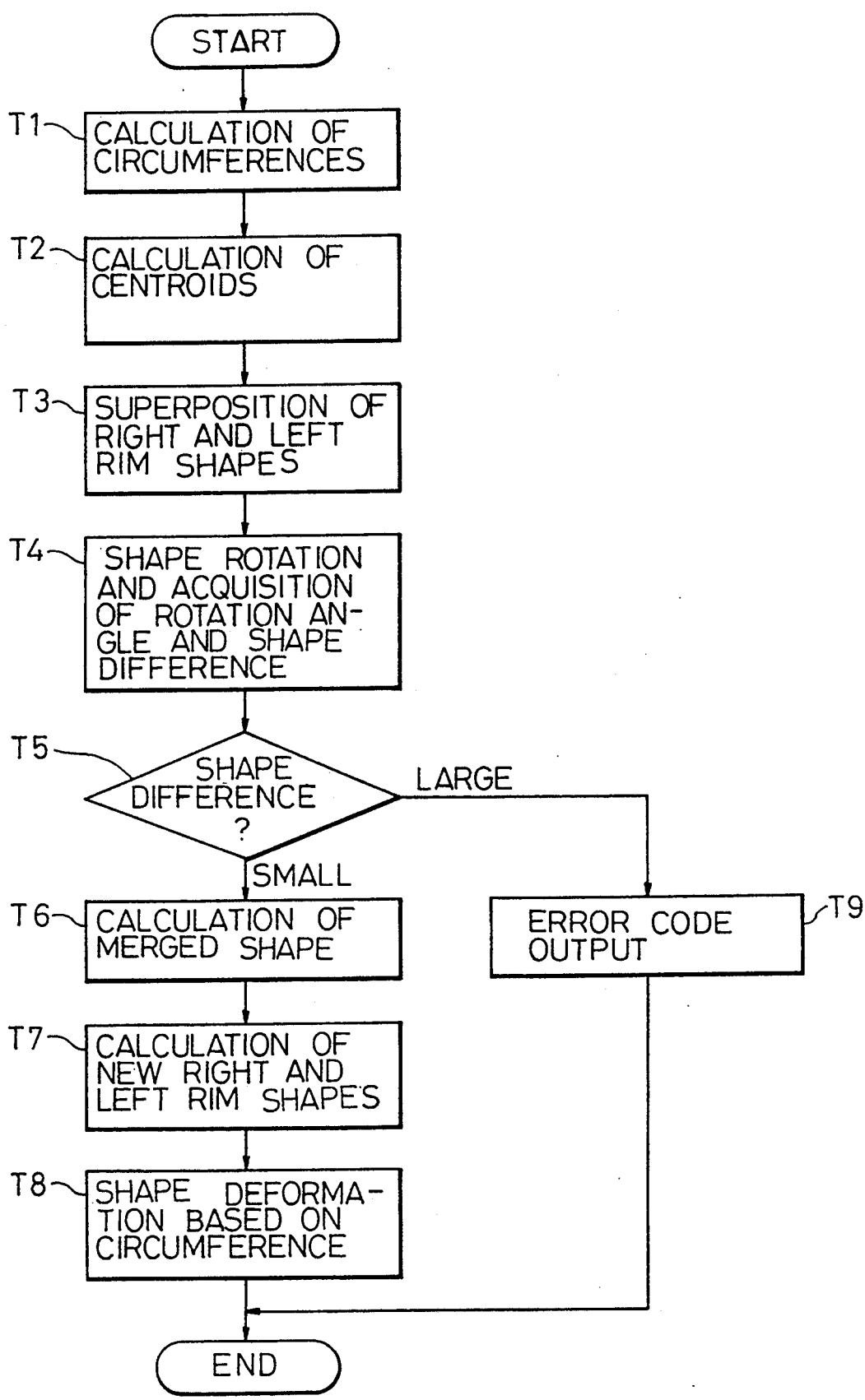
FIG. 23 is a flow chart showing a process for merging the shapes of right and left frame rims, corresponding to the process of Step S613 in FIG. 5.

FIG. 23 is a flow chart of the process for merging the shapes of the right and left frame rims, corresponding to the process of Step S613 in FIG. 5. In the chart, numbers following "T" represent step numbers.

Figure 24:
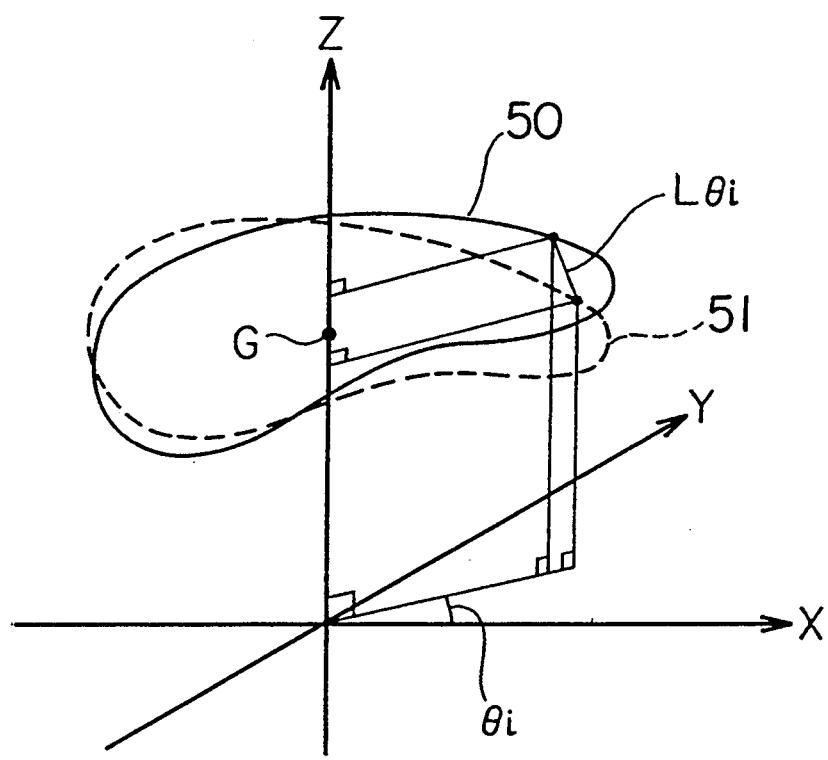
FIG. 24 is a diagram showing how a difference between right and left frame rim shapes is detected.
Figure 25A:
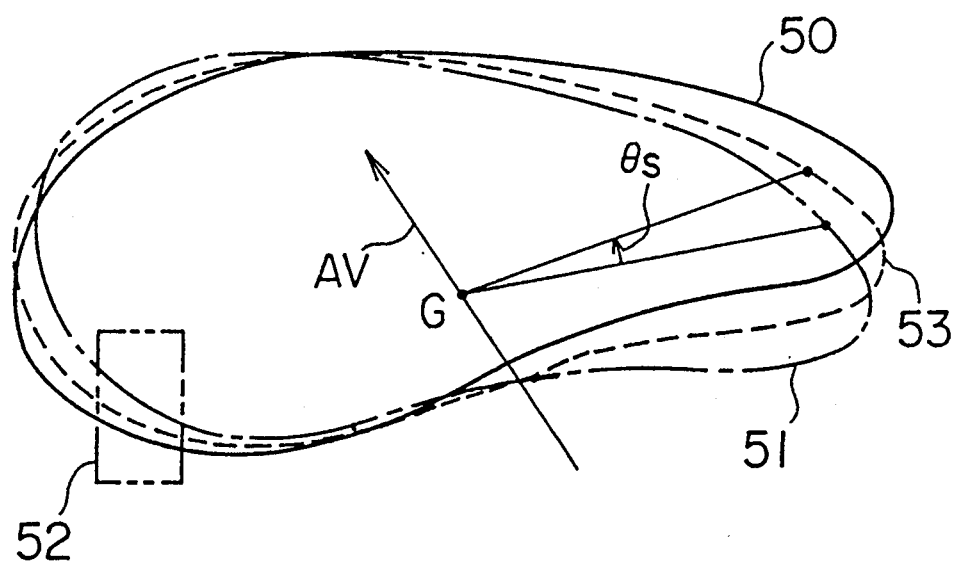
FIG. 25(A) is a perspective view showing a new frame rim shape.
Figure 25B:
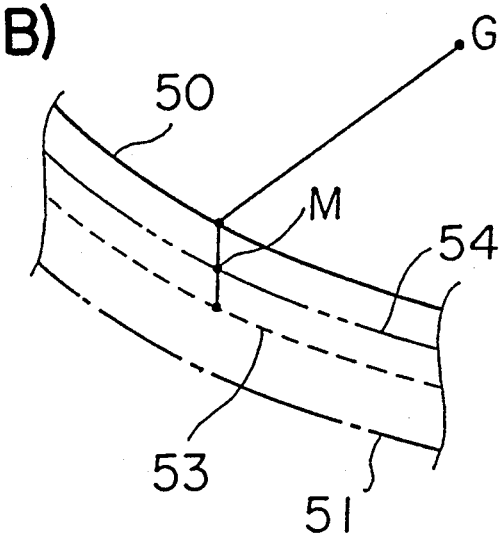
FIG. 25(B) is an enlarged view of a part 52 shown in FIG. 25 (A).

The flow chart will be explained with reference also to FIGS. 24 and 25 when needed. FIG. 24 illustrates a procedure for detecting an amount of shape difference between the right and left frame rims, and FIG. 25 shows a new frame rim shape in perspective. FIG. 25(B) is an enlarged view of a part 52 shown in FIG. 25(A).

[T1] First, the circumferences of the right and left frame rims are calculated, based on the orthogonal coordinates (Xn, Yn, Zn) of the right and left frame rim shapes with reference to the coordinate systems having origins thereof at the respective geometrical centers, obtained in Step S610.

[T2] Further, based on the same orthogonal coordinates (Xn, Yn, Zn) of the right and left frame rim shapes obtained in Step S610, weighted means are computed to obtain the centroid of each of the right and left frame rim shapes.

[T3] Then, the signs of the X-axis coordinates of the left frame rim shape are inverted, and the left frame rim shape 51 is superposed on the right frame rim shape 50, with their centroids coinciding with an identical point G, as shown in FIG. 24. Subsequently, based on individual radius vectors $\theta i$ directed from the point G, a summation of differences $L\theta i$ in distance between the right and left frame rims is obtained and is set as an amount DE of difference between the right and left frame rim shapes.

A certain deformation limit is set in advance for the difference DE.

[T4] Subsequently, with the right frame rim shape 50 fixed, the left frame rim shape 51 is rotated about the point G such that the difference DE becomes a minimum, as shown in FIG. 25(A). On obtaining a rotated left frame rim shape (hereinafter referred to as second left frame rim shape) 53 with respect to which the difference DE is a minimum, an angle $\theta s$ by which the left frame rim shape has been rotated and a vector AV in the direction of the axis about which the shape was rotated are acquired.

[T5] The rotation angle $\theta s$ and the minimum difference are compared with a predetermined rotation angle and a predetermined difference, respectively. If the former are greater than the latter (the predetermined reference values are exceeded) and thus there is a large difference between the right and left frame rim shapes, it is concluded that the right and left frame rim shapes cannot be merged for balancing, and the program proceeds to Step T9; if not, that is, if the former are smaller than the latter and the shape difference is small, the program proceeds to Step T6 to merge the right and left frame rim shapes to make the frame rims well-balanced.

[T6] Then, a merged frame rim shape 54 is computed which is an intermediate shape between the second left frame rim shape 53 and the right frame rim shape 50, as shown in FIG. 25(B). Namely, middle points M between corresponding points of the right and left frame rim shapes are obtained for the individual radius vectors $\theta i$. Instead of calculating the middle points, the merged frame rim shape 54 can be determined as a set of points obtained by dividing the distances between corresponding points of the second left frame rim shape 53 and the right frame rim shape 50 by a predetermined ratio.

[T7] Based on the merged frame rim shape 54, new right and left frame rim shapes are determined. Specifically, coordinates of the merged frame rim shape 54 are obtained, and the obtained coordinates are set as the coordinates of a new right frame rim shape. Further, the coordinates of the merged frame rim shape 54 are rotated about the vector AV of the rotation axis passing through the point G, by the rotation angle $\theta s$ in a direction opposite to that of the aforementioned case, and are further divided by the circumference ratio, and the resulting coordinates are set as the coordinates of a new left frame rim shape.

[T8] The new right and left frame rim shapes, determined in Step T7, are deformed into respective similar shapes such that the circumferences of the new right and left frame rim figures, determined in Step T7, coincide with the respective circumferences of the right and left frame rim shapes calculated in Step T1.

[T9] The difference DE and the rotation angle $\theta s$, obtained in this process, are values representing degree of unbalance between the right and left frame rim shapes. Thus, if these values are greater than respective predetermined limit values, the merging process is not carried out, and an error code is output to notify poor balance of the right and left frame rim shapes. When the error code is output, the right and left frame rim shapes are visually checked to determine a preferable shape, in accordance with which the shape of the other frame rim is deformed for matching.

Since the shapes of the right and left frame rims are deformed in the merging process described above, Steps S610 to S612 are executed again.

In the above embodiment, the merging process is performed on three-dimensional shapes, but a two-dimensional merging process may alternatively be carried out by a similar method, using only X- and Y-axis components. In this case, however, the shape lying on the torical surface, obtained in Step S611, must be used as the frame rim shape.

As described above, the forward directions of the right and left frame rims, the forward direction of the spectacles, and the direction of the datum line of the spectacles on a plane perpendicular to the forward direction of the spectacles are calculated (Steps S604, S607 and S608), and based on the calculated directions, the inter-rim distance and the inclinations of the frame rims are computed (Steps S609 and S612). Accordingly, the inter-rim distance and the inclinations of the frame rims can be accurately calculated, regardless of the mounting position of the frame with respect to the frame shape measuring apparatus.

Further, the distance between the bottom of the inner peripheral groove and the edge of the probe is calculated based on the data representing the shape of the inner peripheral groove and the shape of the probe and the data representing the three-dimensional travel path of the probe, and the envelope of the travel path of the edge of the probe is corrected based on the calculated distance, to obtain the bottom contour of the inner peripheral groove (Steps S601 and S602). Thus, even in the event the edge of the probe is displaced or separated from the bottom of the inner peripheral groove and the contact therebetween is lost, such displacement is compensated for, thus making it possible to accurately calculate the bottom contour of the inner peripheral groove cut in the frame rim. Further, even when the forward direction of the spectacles is not exactly aligned with the Z axis of the frame shape measuring apparatus, an accurate bottom contour of the inner peripheral groove can be computed, thus preventing the problem with conventional systems that different data is derived as the bottom contour of the inner peripheral groove each time the frame is mounted to the frame shape measuring apparatus, though the frame measured is the same.

Furthermore, one of the right and left frame rim shapes is rotated such that the right and left frame rim shapes are substantially superposed one on the other with their centroids coinciding with each other, a merged shape is created based on the substantially superposed right and left frame rim shapes, and new right and left frame rim shapes are computed based on the merged shape thus created (Steps T3, T6 and T7). Accordingly, the amount of deformation of the frame rim shapes can be reduced when balancing the right and left frame rims with each other.

The circumference of each of the right and left frame rim shapes is calculated before a merged shape is created, and the calculated new right and left frame rim shapes are deformed into respective similar shapes such that the circumferences of the new right and left frame rim shapes equal the previously calculated circumferences of the respective frame rim shapes (Steps T1 and T8). Thus, the shapes of the right and left frame rims can be matched and balanced without changing the circumferences of the frame rims.

Moreover, the created merged shape is rotated in a direction opposite to the direction in which the frame rim shape was rotated to superpose the right and left frame rim shapes one on the other, to obtain new right and left frame rim shapes (Step T7). Accordingly, the shapes of the right and left frame rims can be matched and balanced without changing the inclinations of the frame rims with respect to the datum line.

Further, one of the right and left frame rim shapes is rotated about an axis of rotation symmetry to make the centroids of the right and left frame rim shapes coincide with each other, and then one of the thus-superposed frame rim shapes is rotated about an axis passing through the coincident centroids such that the summation of distances between corresponding points of the frame rim shapes becomes a minimum (Steps T3 and T4). Based on a rotated shape with respect to which the summation of the distances is a minimum, an angle by which the frame rim shape has been rotated is acquired, and the summation of the distances and the rotation angle are compared with respective preset allowable values, to determine the difference between the right and left frame rim shapes (Step T5).

Accordingly, the difference between the right and left frame rim shapes can be quantified, and the provision of a quantitative criterion permits accurate and stable determination of the shape difference.

When the summation of distances and the rotation angle mentioned above are greater than the respective allowable values, it is concluded that the difference between the right and left frame rim shapes are too large to match the frame rims for balancing. On the other hand, when the summation of distances and the rotation angle are smaller than the respective allowable values, the right and left frame rim shapes are matched with each other, thereby balancing the frame rim shapes (Step T5).

Consequently, the frame rims can be appropriately deformed within a deformable range, thus making it possible to provide a frame having well-balanced frame rims.

The present invention can be applied to making a bevel groove in the edge surface of a lens to obtain rimless spectacles.

The foregoing is considered as illustrative only of the principles of the present invention Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A spectacle frame shape determining method of determining values representing shapes of frame rims of spectacles positioned in an arbitrary spatial position with respect to a three-dimensional frame shape measuring apparatus, the method comprising the steps of:

(1) setting a spectacle frame in the three-dimensional frame shape measuring apparatus;
   (2) measuring a contour of the spectacle frame by the three-dimensional frame shape measuring apparatus to obtain coordinates of right and left frame rims;
   (3) determining a forward direction of each of the right and left frame rims;
   (4) determining a forward direction of the spectacles based on the calculated forward directions of the right and left frame rims;
   (5) determining a direction of a datum line of the spectacles in a plane perpendicular to the calculated forward direction of the spectacles, the direction of the datum line of the spectacles being a direction of a resultant of a unit vector having a direction identical with that of a tangential line tangent to uppermost points of two-dimensional shapes of the right and left frame rims projected onto a plane perpendicular to the forward direction of the spectacles calculated in said step (4), and a unit vector having a direction identical with that of a tangential line tangent to lowermost points of the two-dimensional shapes; and (6) determining values representing a shape of a predetermined part of the frame rims based on the forward directions of the right and left frame rims determined in said step (3), the forward direction of the spectacles determined in said step (4), and the direction of the datum line of the spectacles determined in said step (5) wherein an angle formed on an XY plane between the datum line of the spectacles and an X axis is obtained and the coordinates of the right and left frame rims obtained in said step (2) and unit vectors of the forward directions of the right and left frame rims are transformed such that the datum line coincides with the X axis.

2. A spectacle frame shape determining method according to claim 1, wherein the values determined in said step (6) and representing the shape of the predetermined part of the frame rims include a value representing a distance between the frame rims.

3. A spectacle frame shape determining method according to claim 1, wherein the values determined in said step (6) and representing the shape of the predetermined part of the frame rims include values representing inclinations of the frame rims.

4. A spectacle frame shape determining method according to claim 1, wherein the forward directions of the right and left frame rims are determined in said step (3) such that a two-dimensional shape of each of the right and left frame rims has a maximum area when projected onto a plane perpendicular to the corresponding forward direction.

5. A spectacle frame shape determining method according to claim 1, wherein the forward direction of the spectacles is determined in said step (4) as a direction of a resultant of unit vectors in the respective forward directions of the right and left frame rims determined in said step (3).

6. The method of claim 1, further comprising:
(7) deforming the frame shape as a function of the values representing a shape of a predetermined part of the frame rims determined in step (6).

7. The method of claim 1, further comprising:
(7) manufacturing spectacles as a function of the values representing a shape of a predetermined part of the frame rims determined in step (6).

8. A spectacle frame shape determining method of determining a contour of an inner peripheral groove in a frame rim based on a path of travel of a probe which has a symmetrical shape with respect to an axis of rotation symmetry and which moves along the inner peripheral groove while contacting the same, the method comprising the steps of:
(1) contacting the probe with the inner peripheral groove;
(2) measuring a three-dimensional path of travel of the probe by shifting the probe along the inner peripheral groove;
(3) obtaining a contour of the inner peripheral groove based on data representing the three-dimensional path of travel of the probe;
(4) determining a distance between a bottom of the inner peripheral groove and the edge of the probe, based on data representing the shapes of the inner peripheral groove and of the probe, and the data representing the three-dimensional path of travel of the probe; and
(5) correcting the contour of the inner peripheral groove by shifting the contour of the inner peripheral groove obtained in step (3) in a normal direction by the distance determined in said step (4).

9. A spectacle frame shape determining method according to claim 8, wherein the data representing the shape of the inner peripheral groove, which is used to determine the distance in said step (4), comprises values representing width and angle of the inner peripheral groove.

10. A spectacle frame shape determining method according to claim 8, wherein the data representing the shape of the probe, which is used to determine the distance in said step (4), comprises a value representing a radius of the probe and data representing a sectional shape of the probe containing the axis of rotation symmetry.

11. The method of claim 8, further comprising:
(6) deforming the shape of the spectacle frame as a function of the contour corrected in step (5).

12. The method of claim 8, further comprising:
(6) manufacturing spectacles as a function of the contour corrected in step (5).

13. A spectacle frame shape determining method of matching substantially symmetrical shapes of right and left frame rims with each other, the method comprising the steps of:
(1) measuring right and left frame rim shapes which are substantially symmetrical with each other;
(2) determining a centroid of each of shapes of the right and left frame rims;
(3) rotating one of the right and left frame rim shapes about an axis of rotation symmetry such that the right and left frame rim shapes are substantially superposed one upon the other with the calculated centroids coinciding with each other;
(4) creating a merged shape based on the substantially superposed right and left frame rim shapes;
(5) determining new right and left frame rim shapes based on the created merged shape; and
(6) reforming the spectacles as a function of the frame rim shapes determined in step (5).

14. A spectacle frame shape determining method according to claim 13, which further comprises the step of:
(7) determining a circumference of each of the right and left frame rim shapes before the merged shape is created; and wherein step (6) includes
deforming the new right and left frame rim shapes, determined in said step (5), into respective similar shapes such that circumferences of the new right and left frame rim shapes determined in said step (5) coincide with corresponding ones of the circumferences of the right and left frame rim shapes determined in said step (7).

15. A spectacle frame shape determining method of matching substantially symmetrical shapes of right and left frame rims with each other, the method comprising the steps of:

(1) measuring right and left frame rim shapes which are substantially symmetrical with each other;
(2) determining a centroid of each of shapes of the right and left frame rims;
(3) rotating one of the right and left frame rim shapes about an axis of rotation symmetry such that the calculated centroids coincide with each other;
(4) rotating one of the right and left frame rim shapes whose centroids have been made coincident with each other, about an axis passing through the coincident centroids such that a summation of distances between corresponding points of the right and left frame rim shapes becomes a minimum;
(5) acquiring a minimum summation of distances between the corresponding points of the right and left frame rim shapes and a rotation angle by which said one of the right and left frame rim shapes is rotated;
(6) comparing the minimum summation of the distances and the rotation angle with respective present allowable values, to determine a difference between the right and left frame rim shapes; and
(7) reforming the spectacle frame based upon the difference determined in step (6).

* * * * *